United States Patent
Cable

(10) Patent No.: US 12,189,261 B2
(45) Date of Patent: Jan. 7, 2025

(54) COUNTERPROPAGATING GENERALIZED MACH ZEHNDER INTERFEROMETER

(71) Applicant: Psiquantum, Corp., Palo Alto, CA (US)

(72) Inventor: Hugo Cable, San Mateo, CA (US)

(73) Assignee: Psiquantum, Corp., Palo Alto, CA (US)

( * ) Notice: Subject to any disclaimer, the term of this patent is extended or adjusted under 35 U.S.C. 154(b) by 190 days.

(21) Appl. No.: 17/858,699

(22) Filed: Jul. 6, 2022

(65) Prior Publication Data

US 2023/0010363 A1 Jan. 12, 2023

Related U.S. Application Data

(60) Provisional application No. 63/218,689, filed on Jul. 6, 2021.

(51) Int. Cl.
*G02F 1/225* (2006.01)
*G02F 1/21* (2006.01)

(52) U.S. Cl.
CPC ............. *G02F 1/212* (2021.01); *G02F 1/225* (2013.01)

(58) Field of Classification Search
CPC ....................................................... G02F 1/212
See application file for complete search history.

(56) References Cited

U.S. PATENT DOCUMENTS

| | | | |
|---|---|---|---|
| 7,499,177 B2* | 3/2009 | Katsifolis | G08B 13/186 356/483 |
| 10,534,130 B1 | 1/2020 | Ravi et al. | |
| 2009/0135430 A1* | 5/2009 | Zhu | G01B 9/02057 356/487 |
| 2015/0055961 A1* | 2/2015 | Meyers | G06N 10/00 398/140 |
| 2019/0196100 A1 | 6/2019 | Nickerson et al. | |
| 2021/0027188 A1 | 1/2021 | Nickerson et al. | |
| 2021/0325924 A1 | 10/2021 | Cable | |

* cited by examiner

*Primary Examiner* — Eric Wong
(74) *Attorney, Agent, or Firm* — Kilpatrick Townsend & Stockton LLP

(57) ABSTRACT

Photons can propagate concurrently in two different directions along optical paths in a generalized Mach Zehnder interferometer (GMZI). A counterpropagating GMZI can include a first set of input ports and a second set of input ports, a first set of output ports and a second set of output ports, and optical components interconnected to form a GMZI that can selectably establish a first optical path between one of the first set of input ports and one of the first set of output ports and a second optical path between one of the second set of input ports and one of the second set of output ports. The first optical path and the second optical path can include an overlapping portion though which photons on the first and second optical paths propagate in opposing directions.

11 Claims, 15 Drawing Sheets

Circuit notation

─●─ 2-mode beamsplitter/directional coupler
─●─ (transfer matrix is 2x2 Hadamard matrix)

$$\begin{aligned}W &= \\ &= (S_{N/n_1, n_1} I^{(N/n_1)} \otimes W^{(n_1)} S_{N/n_1, n_1}^t)(I^{(n_1)} \otimes S_{N/(n_1 n_2), n_2} I^{(N/n_2)} \otimes W^{(n_2)} I^{(N/(n_1 n_2))}) \cdots (I^{(N/n_r)} \otimes W^{(n_r)}) \\ &\quad (W^{(n_1)} \otimes I^{(N/n_1)})(I^{(n_1)} \otimes W^{(n_2)} \otimes I^{(N/(n_1 n_2))}) \cdots (I^{(N/n_r)} \otimes W^{(n_r)}) \\ &\quad (I^{(n_1)} \otimes S_{N/(n_1 n_2), n_2} I^{(N/n_2)} \otimes W^{(n_2)} I^{(n_1)} \otimes S_{N/(n_1 n_2), n_2}^t) \cdots \\ &\quad (I^{(N/n_r)} \otimes W^{(n_r)})\end{aligned}$$

COUNTERPROPAGATING GENERALIZED MACH ZEHNDER INTERFEROMETER

CROSS-REFERENCE TO RELATED APPLICATION

This application claims the benefit of U.S. Provisional Application No. 63/218,689, filed Jul. 6, 2021, the disclosure of which is incorporated herein by reference.

BACKGROUND

This disclosure relates generally to linear optics and in particular to a Generalized Mach Zehnder Interferometer (GMZI) with counterpropagating optical paths.

Photonic switches operate to selectably direct photons from one of a set of input paths to one of a set of output paths. In some switches, paths can be selected by operating active optical components to provide the desire optical coupling and/or to suppress undesired optical couplings. Photonic switches have a variety of applications, including any type of linear optical circuits.

SUMMARY

Certain embodiments of the present invention relate to Generalized Mach Zehnder Interferometers (GMZI) configured such that photons can propagate concurrently in two different directions along the optical paths. Such configurations are referred to herein as "counterpropagating" GMZIs.

According to some embodiments, a circuit can include: a plurality of input ports to receive photons, the plurality of input ports including a first set of input ports and a second set of input ports; a plurality of output ports to output photons, the plurality of output ports including a first set of output ports and a second set of output ports; and a plurality of optical components including a plurality of active phase shifters, the plurality of optical components interconnected to form a generalized Mach Zehnder interferometer (GMZI) configured to selectably establish a first optical path between one of the input ports of the first set of input ports and one of the output ports of the first set of output ports and a second optical path between one of the input ports of the second set of input ports and one of the output ports of the second set of output ports, wherein the first optical path and the second optical path include an overlapping portion and wherein a propagation direction through the overlapping portion along the first optical path is counter, or opposite, to a propagation direction through the overlapping portion along the second optical path.

The following detailed description, together with the accompanying drawings, will provide a better understanding of the nature and advantages of the claimed invention.

BRIEF DESCRIPTION OF THE DRAWINGS

FIG. 16 shows an equation for a type of specific decomposition of GMZI networks that can be used in some embodiments.

DETAILED DESCRIPTION

Figure 1:
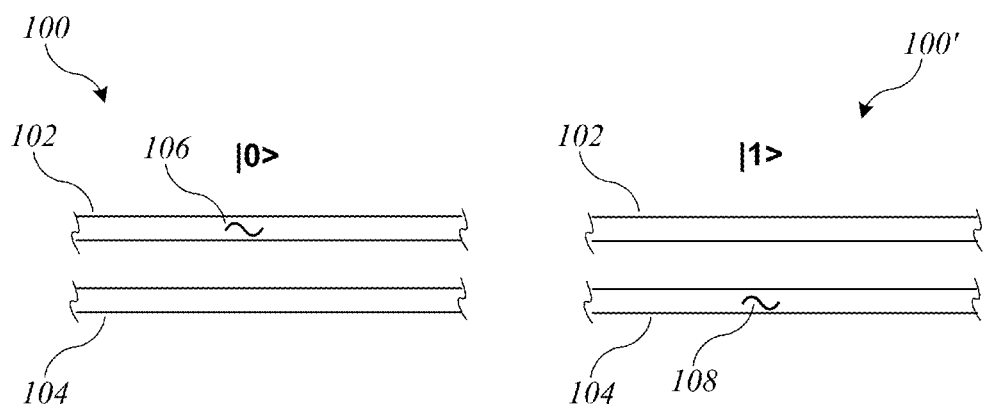
FIG. 1 shows representations of a portion of a pair of waveguides 102, 104 that can be used to provide a dual-rail-encoded photonic qubit.

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

GMZIs and can be used as the building blocks for many photonic switching networks.

In general, an N-mode GMZI when configured as an N×N switch enacts a set of N (commuting) permutations on the inputs, with the specific ability to transfer light from any one chosen input port to any target output port. There are typically many variations of GMZIs of the same size which perform different sets of switching operations. For example, a GMZI can be configured as an N×1 optical switch that can transfer light from any one chosen input ports to the output port. Examples of GMZIs and optical circuits incorporating GMZIs are described below with reference to FIGS. 11A-18B.

Embodiments described herein relate to a configuration referred to as a "counterpropagating" GMZI, in which light (photons) can propagate through a GMZI simultaneously in both directions. Counterpropagating GMZIs can be realized by an appropriate coupling of a GMZI to other optical components; examples of such couplings are described below. In some embodiments, the GMZI can be a "Hadamard-type" GMZI. This type of GMZI is an N-mode device which can enact N switching configurations (where N is any power of two). Each of these configurations performs a permutation operation on the light at the input ports, and it is possible to route light from any one input port to any chosen target output port. The configurations are selected using one layer of active phase shifter devices which are set to values 0 or π. Thus, a Hadamard-type GMZI can be used as an N×N optical switch. A Hadamard-type GMZI can also be used as an N×1 optical switch by using just one of the output ports as an active output port and routing light from a selected input port to the active output port. Other configurations are also possible.

1. Overview of Photonic Qubits

Among other applications, GMZIs can be used to manipulate photonic quantum systems in applications such as quantum computing and quantum communication. For example, photons propagating in waveguides can be created and manipulated to produce specifically quantum effects such as superposition states and/or entangled states. A brief overview of quantum systems and photonic implementations thereof is provided to facilitate understanding of portions of the present disclosure.

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon is propagating in, and the temporal mode $t_j$ is determined by which one of a set of discrete time periods (referred to herein as "bins") the photon is present in. In some photonic implementations, the degree of temporal discretization can be provided by a pulsed laser which is responsible for generating the photons. As used herein, terms such as "simultaneous" or "concurrent" refer to events occurring within the same time bin, and terms such as "synchronous" (or "synchronized") refer to events separated by a predictable, constant number of time bins, which can but need not be zero.

The quantum states of quantum systems can be used to encode information. For instance, a quantum state can be used to encode one bit of information if the quantum state space can be modeled as a (complex) two-dimensional vector space, with one dimension in the vector space being mapped to logical value 0 and the other to logical value 1. Such states are referred to herein as "qubits." In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems, including polarization states of photons; presence of photons in waveguides; or energy states of photons.

For example, a qubit can be "dual-rail encoded" such that the logical value of the qubit is encoded by occupation of one of two modes of the quantum system in a given time bin. In the context of photons, a dual-rail-encoded qubit can be implemented using a pair of waveguides and spatio-temporal modes. FIG. 1 shows representations (100, 100') of a portion of a pair of waveguides 102, 104 that can be used to provide spatial modes for a dual-rail-encoded photonic qubit. Representations 100 and 100' can correspond to the same section of waveguides 102, 104 at two different time bins (or two different temporal modes). At 100, a photon 106 is in waveguide 102 (also referred to as "an occupied mode") and no photon is in waveguide 104 (also referred to as a "vacuum mode"); in some embodiments, this corresponds to the logical-0 state of a qubit. At 100', a photon 108 is in waveguide 104, and no photon is in waveguide 102; in some embodiments this corresponds to the logical-1 state of the qubit. (The spatial modes that a qubit can occupy are sometimes referred to as "rails"; for instance, "dual-rail encoding" refers to the use of two spatial modes.) To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having multiple qubits whose logical states correspond to different spatiotemporal modes can be created. It should be understood that a pair of waveguides representing a qubit need not have any particular physical relationship to each other. For instance, they can be but need not be arranged in parallel. Qubits implemented in this manner can be routed through optical circuits using waveguides and optical switches, including embodiments of counterpropagating GMZIs as described below. For dual-rail-encoded qubits, it may be desirable to apply the same switching operations in parallel to both waveguides.

The quantum state of a system of one or more dual-rail-encoded qubits can be manipulated using linear optical components such as mode couplers (or beam splitters) and variable or fixed phase shifters that can change the relative phase of different modes. Using appropriate components, a variety of unitary transformations can be applied to the quantum system, including transformations that create superposition states of a qubit and/or entangled states of multiple qubits. Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode. Particular details of quantum transformations are not necessary to understanding this disclosure.

2. Overview of GMZI

Figure 2:
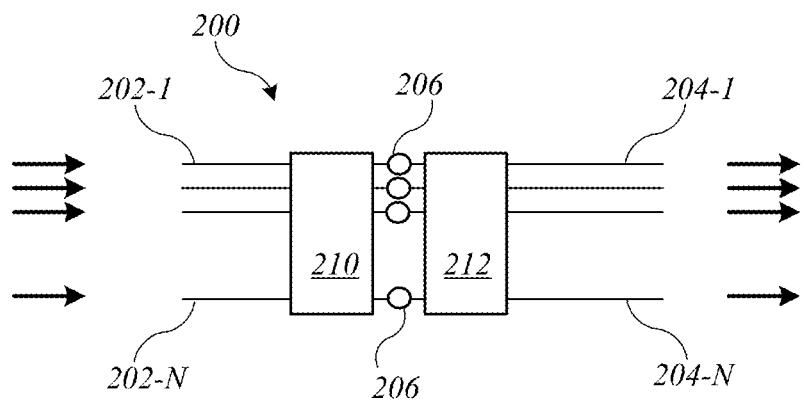
FIG. 2 shows a simplified circuit diagram of a Hadamard-type GMZI according to some embodiments.

FIG. 2 shows a simplified circuit diagram of a Hadamard-type GMZI 200 according to some embodiments. GMZI 200 has a set of N input ports 202-1 through 202-N and a set of N output ports 204-1 through 204-N, where $N=2^a$ for integer a. (In other words, N is a power of 2.) Input ports 202-1 through 202-N are coupled to inputs of a first Hadamard-type passive interferometer 210, and output ports 204-1 through 204-N are coupled to outputs of a second Hadamard-type passive interferometer 212. Each output path of first Hadamard-type interferometer 210 is coupled to a corresponding input path of Hadamard-type passive interferometer 212 by a phase shifter 206. Phase shifters 206 can be active phase shifters, which can be implemented using various technologies. For example, for silica-on-silicon materials, variable phase-shifters can be implemented using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, BTO, and the like, and even doped semiconductors such as silicon, germanium, and the like.

In operation, phase shifters 206 can apply phase shifts in response to control signals from a control circuit (not shown), which can be a digital logic circuit implemented using standard components. The control signals can be generated such that phase shifters 206 and passive interferometers 210, 212 form a desired set of optical paths coupling input ports 202-1 through 202-N to output ports 204-1 through 204-N. In other words, an optical path can be selectably established between any one of ports 202-i and any one of ports 202-j. Further, multiple optical paths between different input ports and different output ports can be simultaneously established. In a Hadamard-type GMZI, arbitrary permutations of the inputs can be performed by applying an appropriate combination of control signals to phase shifters 206.

In various embodiments described below, it can be useful to identify pairs of input ports (and/or pairs of output ports) as corresponding to each other. More specifically, a GMZI can have a configuration defined as corresponding to an N-mode identity transform: if the input ports are assigned numerical identifiers from 1 to N and the output ports are assigned numerical identifiers 1 to N, then the N-mode identity transform is a configuration that results in optical paths between input ports and output ports having the same numerical identifier. These pairs of ports can be referred to as "corresponding" to each other. (For convenience, FIG. 2 and other drawings depict corresponding ports in corresponding locations at opposite ends of the GMZI; however, this is not intended to imply any particular physical arrangement of ports.)

The precision of phase shifters 206 (e.g., shot-to-shot consistency of the phase shift applied) can significantly affect the reliability of GMZI 200. For example, low-precision phase shifters can increase unwanted behavior such as loss due to reduced extinction ratios at the outputs; dephasing (which can be important where maintaining relative phase is desired, such when different GMZIs act on different rails of a qubit that may be in a superposition state as described above); and contamination of light from input ports that are not intended to be routed to a particular output port. In practice, precision of phase shifters may be limited by such factors as: limitations of electronic drivers and other electrical circuitry; potential electrical cross-talk with large-scale integration of components; and possible memory effects for active phase shifters (on both short and long timescales).

Figure 3:
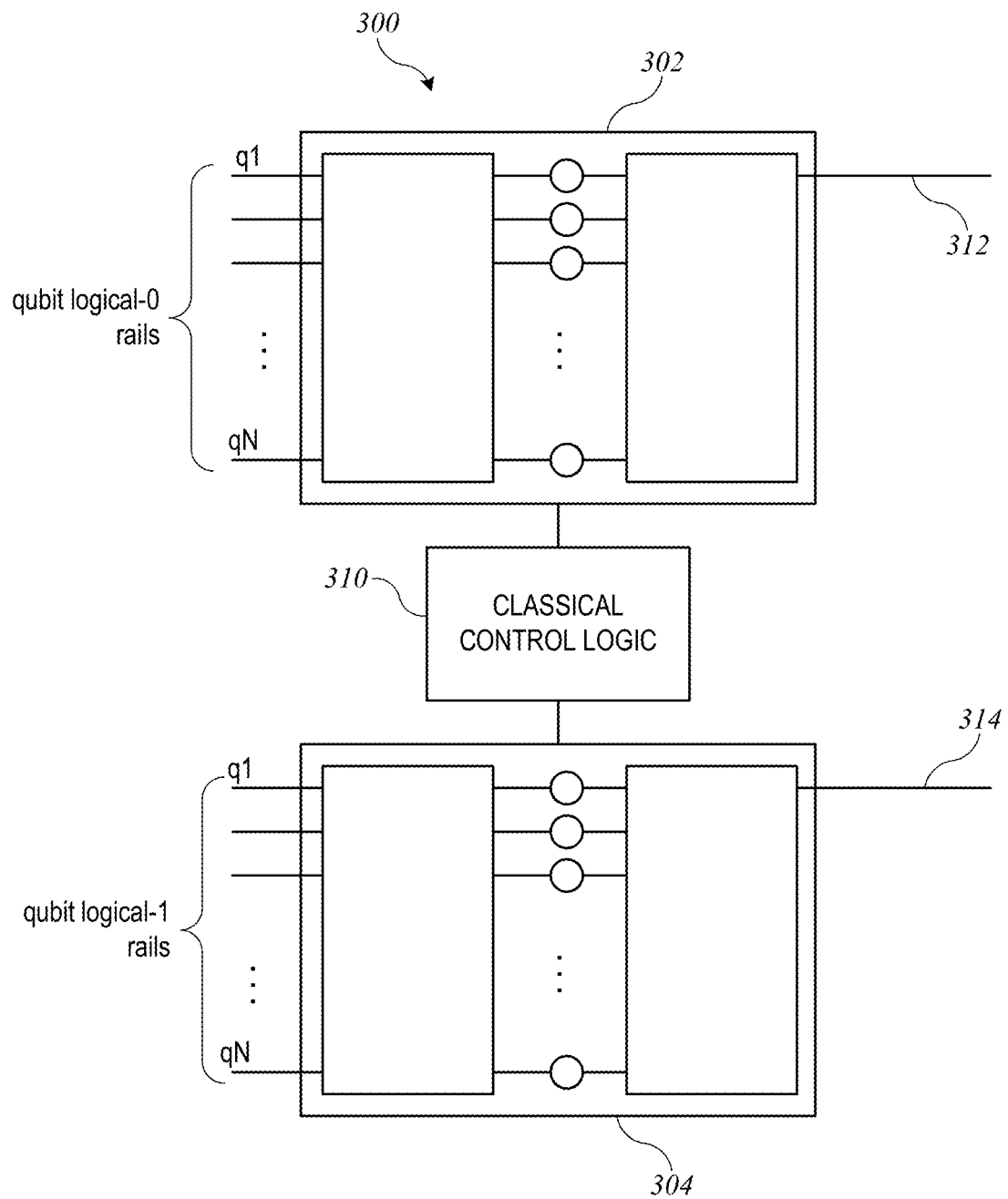
FIG. 3 shows a simplified circuit diagram of a multiplexing circuit that can be used for N×1 multiplexing of dual-rail-encoded qubits.

As an example where dephasing can be of concern, a scenario involving multiplexing of dual-rail-encoded qubits is considered. FIG. 3 shows a multiplexing circuit 300 that can be used for N×1 multiplexing of dual-rail-encoded qubits q1-qN. A first GMZI 302 operates on the logical-0 rails of each qubit while a second, parallel, GMZI 304 operates on the logical-1 rails of each qubit GMZIs 302, 304 can be identically-configured but physically separate optical circuits and can be Hadamard-type GMZIs as described above. At the input side, N dual-rail encoded qubits q1-qN are received, with one rail (e.g., the logical-0 rail) of each qubit q1-qN being coupled to an input port of GMZI 302 and the other rail (e.g., the logical-1 rail) of each qubit being coupled to the corresponding input port of GMZI 304. Classical control logic 310 can operate to select one of qubits q1-qN to propagate and can control GMZIs 302 and 304 such that the logical-0 rail of the selected qubit is propagated to output port 312 while the logical-1 rail of the selected qubit is propagated to output port 314. The particular selection criteria used by classical control logic 110 are not relevant to understanding the present disclosure.

The output qubit may be subject to further "downstream" operations. For instance output ports 312 and 314 may be coupled via waveguides to a beam splitter that acts as a mode coupler between the two rails and that can have effects such as creating a superposition state. For present purposes, it suffices to observe that the downstream operation might not produce the desired result if dephasing between the two rails has occurred, e.g., as a result of differences in the phase shifts applied by GMZIs 302 and 304.

3. GMZI with Counterpropagating Paths

According to some embodiments, dephasing error can be reduced or eliminated by using the same physical structures to propagate both rails of a qubit. For instance, as described above with reference to FIG. 2, an N×N Hadamard-type GMZI 200 has a first set of N ports 202-1 through 202-N and a second set of N ports 204-1 through 204-N. In the configuration described above, all ports 202 are input ports (that receive photons) and all ports 204 are output ports (that provide photons); all photons flow through GMZI 200 in the same "propagation" direction, as indicated by the arrows in FIG. 2. For instance, photons enter at ports 202-1 through 202-N, propagate from first Hadamard-type passive interferometer 210 to phase shifters 206 and from phase shifters 206 to second Hadamard-type passive interferometer 212, then exit at ports 204-1 through 204-N In some embodiments, a GMZI such as GMZI 200 can be reconfigured such that some of ports 202-1 through 202-N and some of ports 204-1 through 202-N are used as input ports while some of ports 202-1 through 202-N and some of ports 204-1 through 204-N are used as output ports, with the result that photons can propagate concurrently in opposing directions along overlapping optical paths through GMZI 200. (For convenience, the opposing directions may be referred to herein as the "propagating" and "counterpropagating" directions.) For instance, ports 202-1 through 202-M and ports 204-1 through 204-M can be used as input ports while the remaining ports 202-(M+1) through 202-N and 204-(M+1) through 204-N are used as output ports. The number M can be chosen as desired, provided that 1≤M<N. In this configuration, different photons can propagate concurrently in both directions through GMZI 200. More specifically, photons received at input ports 202-1 through 202-M propagate through GMZI 200 in a "propagating" direction to output ports 204-(M+1) through 204-N, while photons received at input ports 204-1 through 204-M propagate through GMZI 200 in a "counterpropagating" direction (i.e., a direction opposite, or counter, to the propagating direction) to output ports 202-(M+1) through 202-N. The optical paths of photons in the propagating and counterpropagating directions can overlap; for instance, a photon received at input port 202-1 and a photon received at input port 204-1 can propagate in opposite directions through the same phase shifter 206 (without interacting with each other). A GMZI configured to propagate different photons concurrently in opposing directions along overlapping optical paths is referred to herein as a "counterpropagating GMZI." It should be noted that no particular internal structure of the GMZI is required. A counterpropagating configuration can be created in a variety of GMZIs by appropriately coupling other optical components to the ports such that photons propagate through the GMZI in opposing directions. The number (M) of input ports for the propagating direction can be equal to the number of input ports for the counterpropagating direction, and the number of output ports for the propagating direction can be equal to the number of output ports for the counterpropagating direction. It should be noted that the number of input ports need not be equal to the number of output ports; as described below, and a counterpropagating GMZI can operate as an M×(N−M) optical switch.

In some embodiments, photons in the propagating and counterpropagating directions experience the same average phase Ø(t) due to active phase shifters 206. Since this average phase is also the phase shift at the outputs of the GMZI for both directions, phase shifter imprecision does not lead to relative phase shifts between the photons. Specific examples of counterpropagating GMZI configurations will now be described.

Figures 4A, 4B:
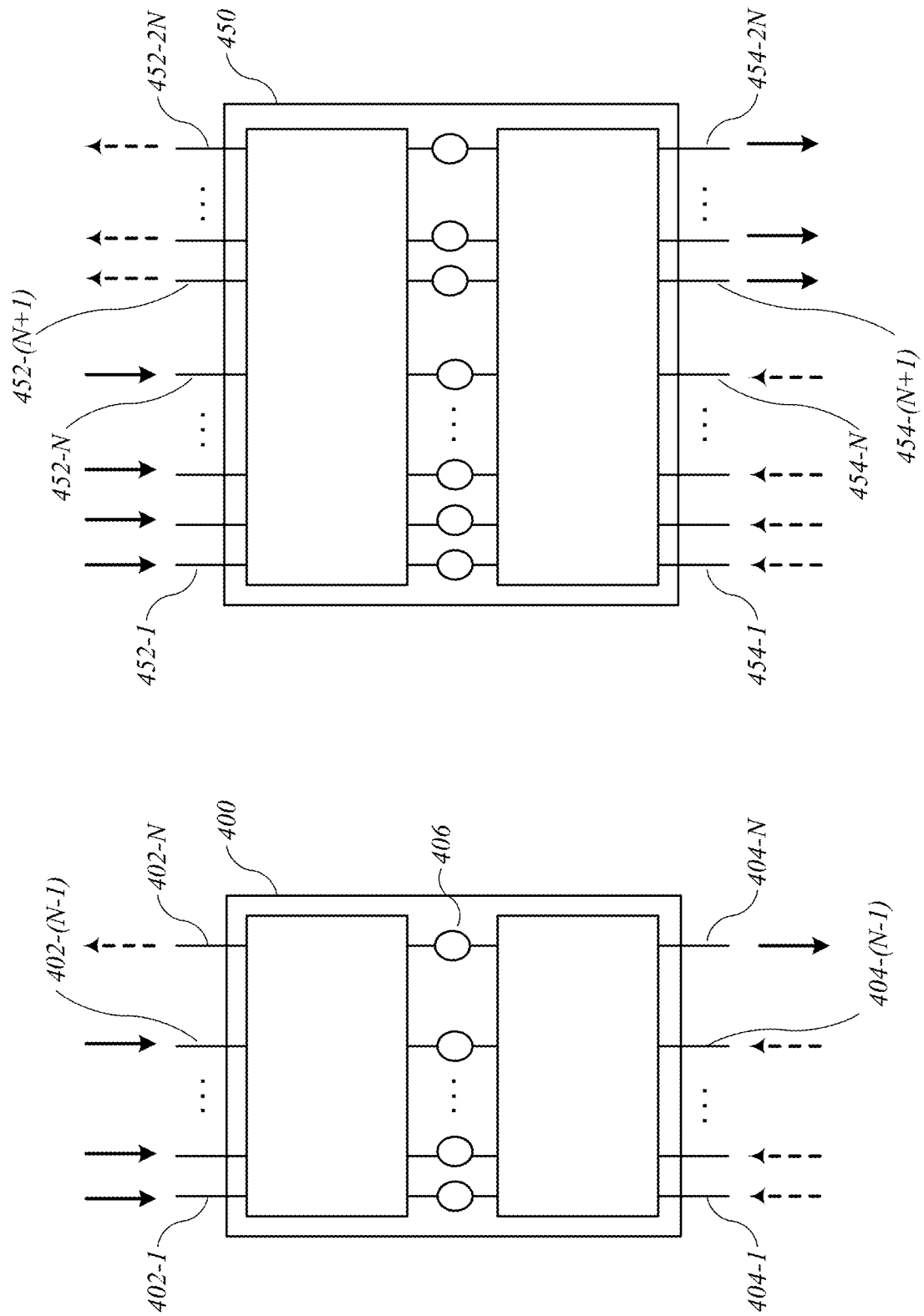
FIGS. 4A and 4B show simplified schematic diagrams of counterpropagating GMZI configurations according to some embodiments.

FIGS. 4A and 4B show simplified schematic diagrams of counterpropagating GMZI configurations according to some embodiments. In FIG. 4A, a counterpropagating GMZI 400 is configured as an (N−1)×1 multiplexer for dual-rail qubits. In FIG. 4B, a counterpropagating GMZI 400 is configured as an N×N switch for dual-rail qubits.

Referring first to FIG. 4A, counterpropagating GMZI 400 can be for, example, an N×N Hadamard-type GMZI circuit and can be constructed similarly or identically to other Hadamard-type GMZIs described herein. In particular, GMZI 400 can provide selectable optical couplings between a first set of ports 402-1 through 402-N and a second set of ports 404-1 through 404-N. Ports 402-1 through 402-N are divided into a first subset having M=(N−1) input ports 402-1 through 402-(N−1) and a second subset having one output port 402-N. Similarly, ports 404-1 through 404-N are divided into a first subset having M=(N−1) input ports 404-1 through 404-(N−1) and a second subset having one output ports 404-N. As described above, different photons can propagate concurrently in opposing directions on overlapping optical paths through GMZI 400.

Counterpropagating GMZI 400 can operate as an (N−1)×1 multiplexer for dual-rail-encoded qubits. For example, as described above, a set of (N−1) dual-rail-encoded qubits can be implemented using a set of (N−1) pairs of waveguides. For each qubit, the logical-0 rail can be coupled to one of input ports 402-$i$ (for 1≤$i$≤(N−1)) while the logical-1 rail is coupled to a corresponding input port 404-$i$. Output port 404-N provides the logical-0 rail of the selected qubit while corresponding output port 402-N provides the logical-1 rail of the selected qubit. The solid arrows indicate the propagation path for the logical-0 rails, and the dashed arrows indicate the propagation path for the logical-1 rails.

To understand the effect of counterpropagating GMZI 406 on dual-rail-encoded qubits, consider a case where photons were input simultaneously into a pair of corresponding input ports (e.g., ports 402-1 and 404-1). The photons would pass through overlapping optical paths in opposing directions; in particular, the photons can pass through active phase shifters 406 in opposite directions at the same time. For dual-rail-encoded qubits where one rail is input to input port 402-1 and the other rail is input to input port 404-1, the overlapping optical paths have the desirable effect that dephasing between the rails can be avoided, which can be useful for propagating qubits in quantum superposition states.

Similarly, as shown in FIG. 4B, counterpropagating GMZI 450 can be, for example, a 2N×2N Hadamard-type GMZI circuit constructed similarly to other Hadamard-type GMZIs described herein. In particular, GMZI 450 can provide selectable optical couplings between a first set of ports 452-1 through 452-2N and a second set of ports 454-1 through 454-2N. Ports 452-1 through 452-N are divided into a first subset of M=N input ports 452-1 through 452-N and a second subset of N output ports 452-(N+1) to 452-2N. Similarly, ports 454-1 through 454-2N are divided into a first subset of M=N input ports 454-1 through 454-N and a second subset of N output ports 454-(N+1) to 454-2N.

Counterpropagating GMZI 450 can operate as an N×N switch for dual-rail qubits. For example, as described above, a set of N dual-rail-encoded qubits can be implemented using a set of N pairs of waveguides. For each qubit, the waveguide corresponding to the logical-0 rail can be coupled to one of input ports 452-$i$ (for 1≤$i$≤N) while the waveguide corresponding to the logical-1 rail is coupled to a corresponding one of input ports 454-$i$. GMZI 450 can apply a desired permutation and output the N permuted qubits such that, for each qubit, the logical-0 and logical-1 rails correspond to a pair of output ports 452-$j$ and 454-$j$.

In various embodiments, an N×N GMZI configured as a counterpropagating GMZI can be used to route a dual-rail-encoded input qubit from one of M pairs of input ports to any of N−M pairs of output rails (the case of M=N−1 is illustrated in FIG. 4A, and a case corresponding to M=N/2 is illustrated in FIG. 4B). As noted above, a counterpropagating GMZI can be used in place of parallel GMZIs to reduce or eliminate dephasing between the rails of a qubit, since both rails of each qubit experience the same shot-to-shot variation at the active phase shifters. The optical paths of the two rails are overlapping but generally not identical, and effects of passive phase shifter variability may differ between the rails; consequently, dephasing might not be entirely eliminated. Passive phase shifter variability, however, can be made very small in practice, e.g., by using trimming and tuning techniques. In some embodiments, other advantages may also obtain, such as reductions in power consumption and switch count for an optical circuit. Thus, even in applications where dephasing is not a concern, such as single-photon multiplexing, there may be hardware space savings from using counterpropagating GMZIs of the kind described herein. In some embodiments, sequencing techniques can be used to support different switch settings for each propagation direction.

Figure 5:
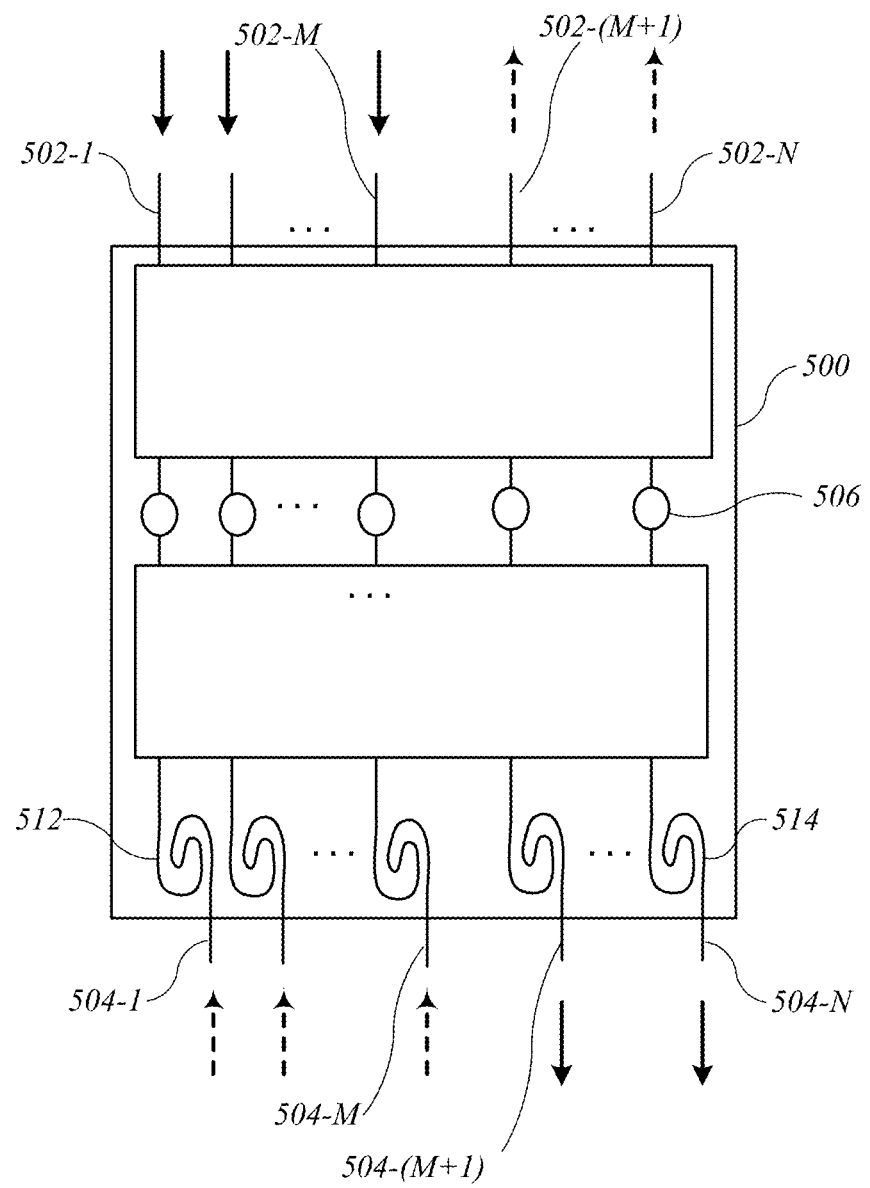
FIG. 5 shows a simplified schematic diagram of a counterpropagating GMZI usable for single-photon multiplexing according to some embodiments.

FIG. 5 shows a simplified schematic diagram of a counterpropagating GMZI 500 for single-photon multiplexing according to some embodiments. GMZI 500 can be an N×N Hadamard-type GMZI circuit constructed similarly to other GMZIs described herein and can have a first set of input ports 502-1 through 502-N. Ports 502-1 through 502-N are divided into a first subset of M input ports 502-1 through 502-M and a second subset of N−M output ports 502-(M+1) to 502-N. Similarly, ports 504-1 through 504-N are divided into a first subset of M input ports 504-1 through 504-M and a second subset of N−M output ports 504-(M+1) to 504-N. Input ports 504-1 through 504-M include delay lines 512, each of which imposes a fixed amount (δ) of delay. Likewise, output ports 504-(N+1) to 504-N include delay lines 514, each of which imposes a delay of δ, which can be selected as desired.

In operation, photons that arrive at ports 504-1 through 504-M are delayed by δ (due to delay lines 512) before passing through GMZI 500; some or all of these photons are selected using GMZI 500 to propagate to output ports 502-(M+1) to 504-N. Photons that arrive at ports 502-1 through 502-M pass through GMZI 500, then are delayed by δ (due to delay lines 514) before arriving at output ports 502-(M+1) to 502-N. As a result, photons that arrive simultaneously at input ports 502-1 through 502-M and 504-1 through 504-M produce simultaneous outputs at ports 504-(M+1) to 504-N and 502-(M+1) to 502-N. However, because of delay lines 512, the photons from ports 504-1 through 504-M pass through GMZI 500 after the photons from ports 502-1 through 502-M. The delay δ can be long enough to allow a change of state of the active phase shifters 506 in GMZI 500 so that the selection among a first group of photons from input ports 502-1 through 502-M can be independent of the selection among a second group of photons from input ports 504-1 through 504-M. In this example, the photons in the two groups do not pass through the active phase shifters simultaneously; however, using a single GMZI for switching operations on both groups, rather than separate GMZIs, may reduce circuit area.

The examples of counterpropagating GMZI configurations presented herein are illustrative, and variations and modifications are possible. A GMZI can include any number of ports. For counterpropagating configurations, it can be helpful to have an equal number of input ports and an equal number of output ports in the propagating and counterpropagating direction and it can be helpful if the GMZI supports a large number of permutations in the coupling of input ports to output ports. Hadamard-type GMZIs, for example, support arbitrary permutations of the couplings, but embodiments are not limited to Hadamard-type GMZIs or to any particular GMZI structure or implementation. For any given GMZI, a combination of settings for active phase shifters that results in each possible permutation of input-to-output couplings can be determined by modeling, and lookup tables or the like can be implemented in digital logic circuits to determine switch settings for a given permutation. In operation, once a desired permutation is identified for a given time bin, the appropriate phase shifter settings can be retrieved and applied. (Identification of a desired permutation depends on the particular application, and particular applications are not relevant to understanding the present disclosure.)

4. Additional Description of Mach Zehnder Interferometers

The foregoing description makes reference to Mach Zehnder interferometers (MI). In some embodiments, an MZI can be used to couple photons propagating in the same time bin in different waveguides. This section provides additional examples of MI behavior and implementations, in part to illustrate techniques that can be used to construct GMZIs and/or phase shifters such as phase shifter 106. For purposes of the present description, a photon (or absence thereof) in a waveguide in a given time bin is referred to as a "mode"; an "occupied" mode has a photon, while an "unoccupied" or "vacuum" mode does not. In some embodiments, mode occupancy can be used to encode information, including quantum information (e.g., qubits or qudits); however, the present disclosure is not limited to any particular use-case.

Figure 6A:
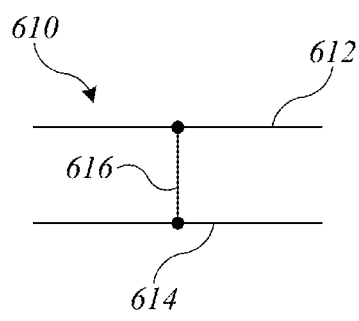
FIG. 6A shows a schematic diagram for coupling of two modes.

FIG. 6A shows a schematic diagram 610 (also referred to as a circuit diagram or circuit notation) for coupling of two modes. The modes are drawn as horizontal lines 612, 614, and the mode coupler 616 is indicated by a vertical line that is terminated with nodes (solid dots) to identify the modes being coupled. In the more specific language of linear quantum optics, the mode coupler 616 shown in FIG. 6A represents a 50/50 beam splitter that implements a transfer matrix:

$$T = \frac{1}{\sqrt{2}} \begin{pmatrix} 1 & i \\ i & 1 \end{pmatrix}, \tag{1}$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 612), and the second column corresponds to creation operators on the second mode (referred to herein as mode 6, labeled as horizontal line 614), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}} \begin{pmatrix} 1 & -i \\ -i & 1 \end{pmatrix} \begin{pmatrix} a_1^\dagger \\ a_2^\dagger \end{pmatrix}_{input}, \tag{2}$$

where subscripts on the creation operators indicate the mode that is operated on, the subscripts input and output identify the form of the creation operators before and after the beam splitter, respectively and where:

$$a_i|n_i, n_j\rangle = \sqrt{n_i}\,|n_i-1, n_j\rangle \qquad (3)$$
$$a_j|n_i, n_j\rangle = \sqrt{n_j}\,|n_i, n_j-1\rangle$$
$$a_j^\dagger|n_i, n_j\rangle = \sqrt{n_j+1}\,|n_i, n_j+1\rangle$$

For example, the application of the mode coupler shown in FIG. 6A leads to the following mappings:

$$a_{1_{input}}^\dagger \mapsto \frac{1}{\sqrt{2}}\left(a_{1_{output}}^\dagger - i a_{2_{output}}^\dagger\right)$$
$$a_{2_{input}}^\dagger \mapsto \frac{1}{\sqrt{2}}\left(-i a_{1_{output}}^\dagger + a_{2_{output}}^\dagger\right)$$

Thus, the action of the mode coupler described by Eq. (1) is to take the input states $|10\rangle$, $|01\rangle$, and $|11\rangle$ to $$|10\rangle \mapsto \frac{|10\rangle - i|01\rangle}{\sqrt{2}} \qquad (5)$$
$$|01\rangle \mapsto \frac{-i|10\rangle + |01\rangle}{\sqrt{2}}$$
$$|11\rangle \mapsto \frac{-i}{2}(|20\rangle + |02\rangle)$$

Figure 6B:
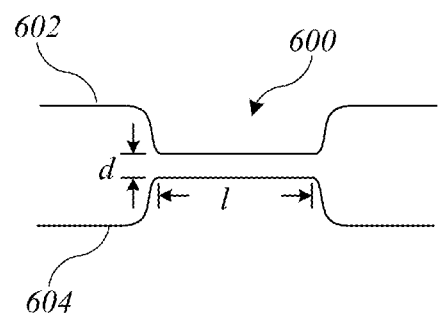
FIG. 6B shows, in schematic form, a physical implementation of mode coupling in a photonic system that can be used in some embodiments.

FIG. 6B shows a physical implementation of a mode coupling that implements the transfer matrix T of Eq. (1) for two photonic modes in accordance with some embodiments. In this example, the mode coupling is implemented using a waveguide beam splitter 600, also sometimes referred to as a directional coupler or mode coupler. Waveguide beam splitter 600 can be realized by bringing two waveguides 602, 604 into close enough proximity that the evanescent field of one waveguide can couple into the other. By adjusting the separation d between waveguides 602, 604 and/or the length l of the coupling region, different couplings between modes can be obtained. In this manner, a waveguide beam splitter 600 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \qquad (6)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 7A:
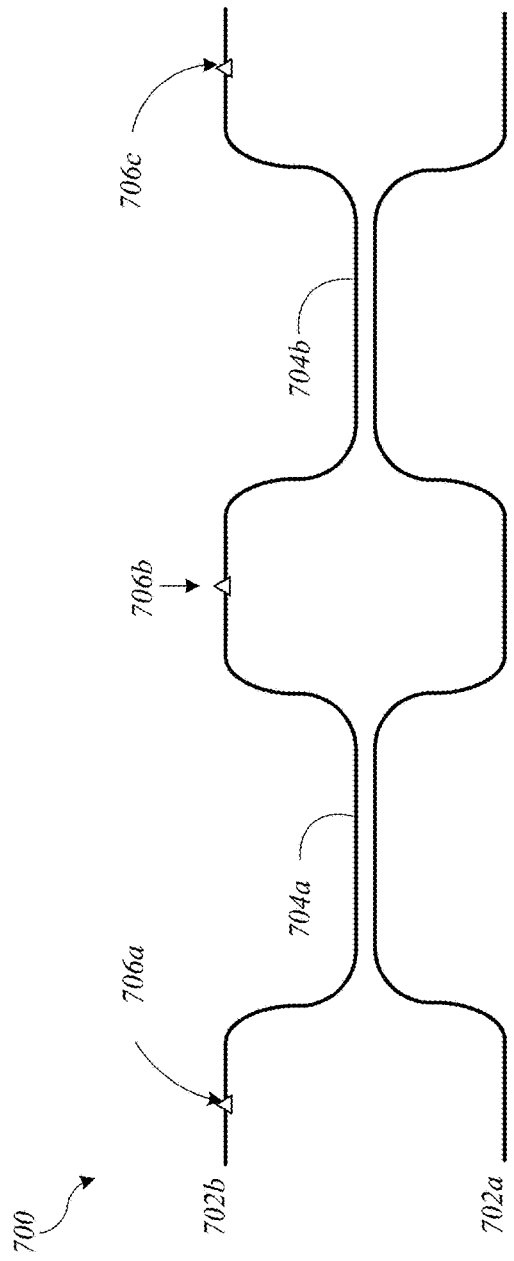
FIGS. 7A and 7B show, in schematic form, examples of physical implementations of a Mach-Zehnder Interferometer (MZI) configuration that can be used in some embodiments.
Figure 7B:
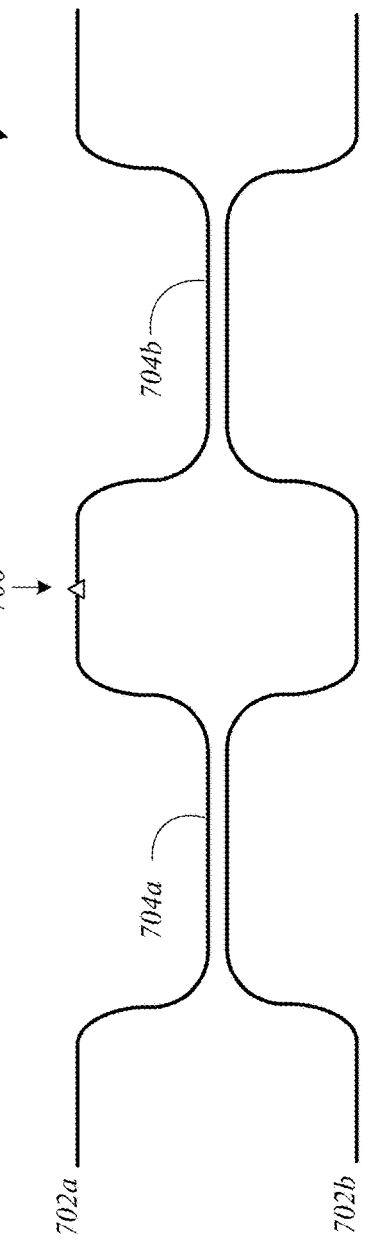

Beam-splitters with variable transmissivity and arbitrary phase relationships between output modes can also be achieved by combining directional couplers and variable phase-shifters in a Mach-Zehnder Interferometer (MZI) configuration 700, e.g., as shown in FIG. 7A. Complete control over the relative phase and amplitude of the two modes 702a, 702b in dual rail encoding can be achieved by varying the phases imparted by phase shifters 706a, 706b, and 706c and the length and proximity of coupling regions 704a and 704b. FIG. 7B shows a slightly simpler example of a MZI 710 that allows for a variable transmissivity between modes 702a, 702b by varying the phase imparted by the phase shifter 706. FIGS. 7A and 7B are examples of how one could implement a mode coupler in a physical device, but any type of mode coupler/beam splitter can be used without departing from the scope of the present disclosure.

Figure 8A:
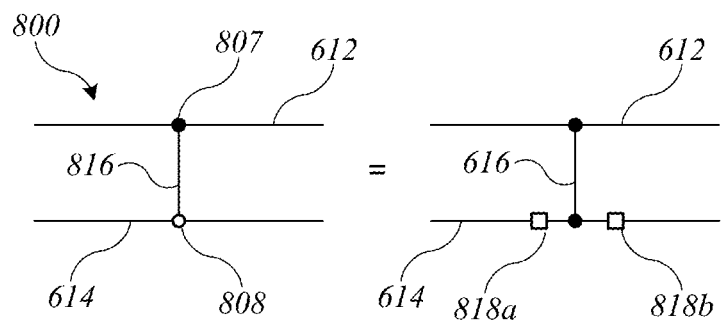
FIG. 8A shows another schematic diagram for coupling of two modes.

In some embodiments, beam splitters and phase shifters can be employed in combination to implement a variety of transfer matrices. For example, FIG. 8A shows, in a schematic form similar to that of FIG. 6A, a mode coupler 800 implementing the following transfer matrix:

$$T_r = \frac{1}{\sqrt{2}}\begin{pmatrix} 1 & 1 \\ 1 & -1 \end{pmatrix}. \qquad (7)$$

Thus, mode coupler 800 applies the following mappings:

$$|10\rangle \mapsto \frac{|10\rangle + |01\rangle}{\sqrt{2}} \qquad (8)$$
$$|01\rangle \mapsto \frac{|10\rangle - |01\rangle}{\sqrt{2}}$$
$$|11\rangle \mapsto \frac{1}{2}(|20\rangle + |02\rangle).$$

Figure 8B:
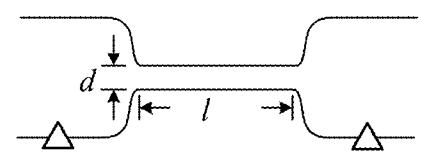
FIG. 8B shows, in schematic form, a physical implementation of the mode coupling of FIG. 4A in a photonic system that can be used in some embodiments.

The transfer matrix $T_r$ of Eq. (7) is related to the transfer matrix T of Eq. (1) by a phase shift on the second mode. This is schematically illustrated in FIG. 8A by the closed node 807 where mode coupler 816 couples to the first mode (line 612) and open node 808 where mode coupler 816 couples to the second mode (line 614). More specifically, $T_r = sTs$, and, as shown at the right-hand side of FIG. 8A, mode coupler 816 can be implemented using mode coupler 616 (as described above), with a preceding and following phase shift (denoted by open squares 818a, 818b). Thus, the transfer matrix $T_r$ can be implemented by the physical beam splitter shown in FIG. 8B, where the open triangles represent +i phase shifters.

Figure 9:
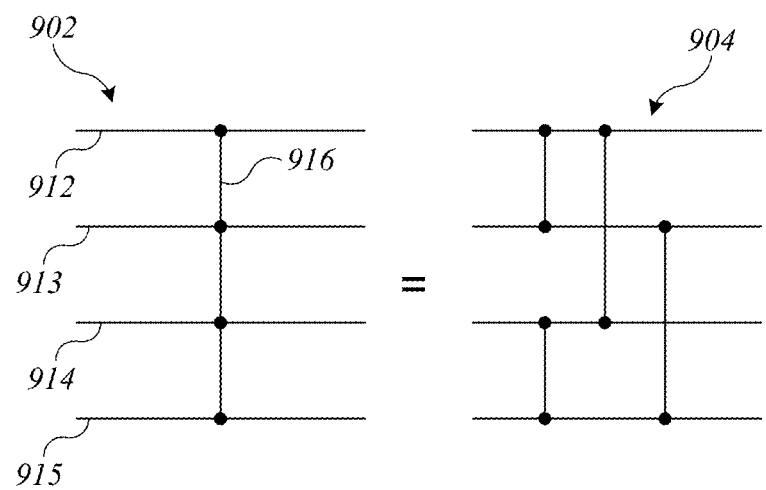
FIG. 9 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 9 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 6A, the horizontal lines 912-915 correspond to modes, and the mode coupling is indicated by a vertical line 916 with nodes (dots) to identify the modes being coupled. In this case, four modes are coupled. Circuit notation 902 is an equivalent representation to circuit diagram 904, which is a network of first-order mode couplings. More generally, where a higher-order mode coupling can be implemented as a network of first-order mode couplings, a circuit notation similar to notation 902 (with an appropriate number of modes) may be used.

Figure 10:
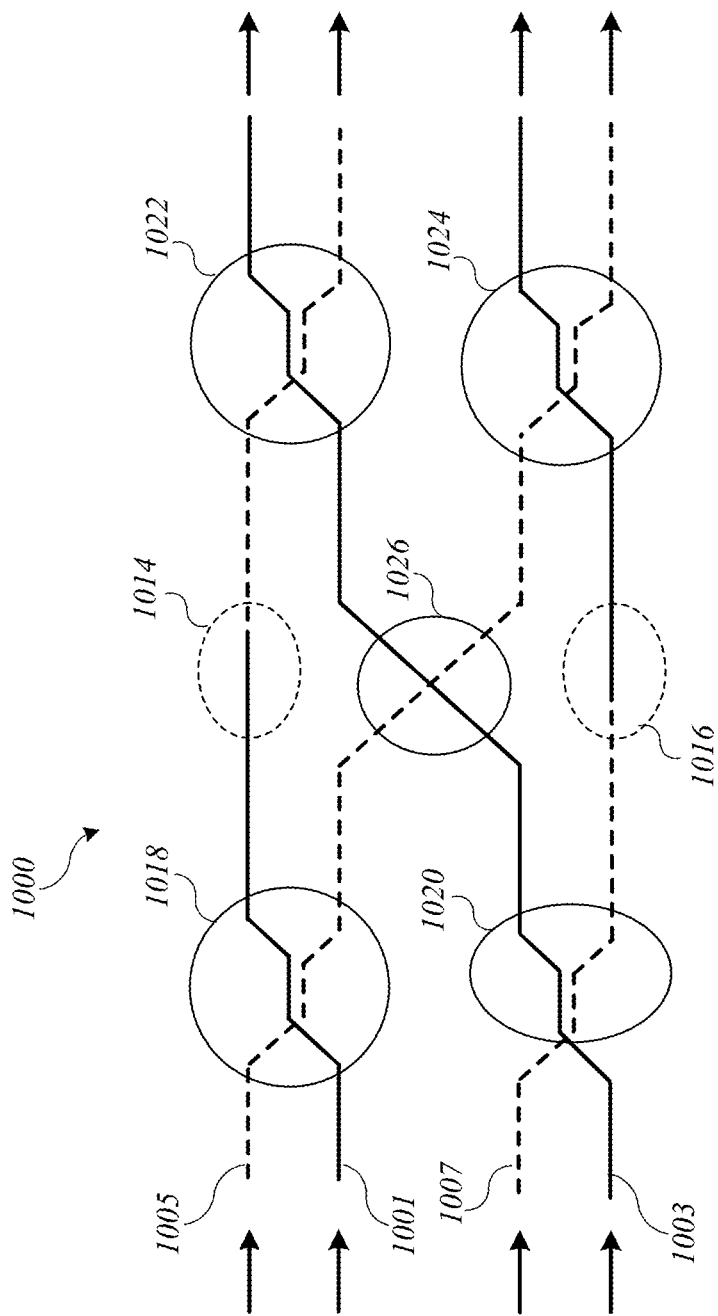
FIG. 10 illustrates an example optical device that can implement the four-mode mode-spreading transform shown schematically in FIG. 9 in accordance with some embodiments.

FIG. 10 illustrates an example optical device 1000 that can implement the four-mode mode-spreading transform shown schematically in FIG. 9 in accordance with some embodiments. Optical device 1000 includes a first set of optical waveguides 1001, 1003 formed in a first layer of material (represented by solid lines in FIG. 10) and a second set of optical waveguides 1005, 1007 formed in a second layer of material that is distinct and separate from the first layer of material (represented by dashed lines in FIG. 10). The second layer of material and the first layer of material are located at different heights on a substrate. One of ordinary skill will appreciate that an interferometer such as that shown in FIG. 10 could be implemented in a single layer if appropriate low loss waveguide crossing were employed.

At least one optical waveguide 1001, 1003 of the first set of optical waveguides is coupled with an optical waveguide 1005, 1007 of the second set of optical waveguides with any type of suitable optical coupler, e.g., the directional couplers described herein (e.g., the optical couplers shown in FIGS. 6B, 7A, 7B). For example, the optical device shown in FIG. 10 includes four optical couplers 1018, 1020, 1022, and 1024. Each optical coupler can have a coupling region in which two waveguides propagate in parallel. Although the two waveguides are illustrated in FIG. 10 as being offset from each other in the coupling region, the two waveguides may be positioned directly above and below each other in the coupling region without offset. In some embodiments, one or more of the optical couplers 1018, 1020, 1022, and 1024 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 10 can include two inter-layer optical couplers 1014 and 1016. Optical coupler 1014 allows transfer of light propagating in a waveguide on the first layer of material to a waveguide on the second layer of material, and optical coupler 1016 allows transfer of light propagating in a waveguide on the second layer of material to a waveguide on the first layer of material. The optical couplers 1014 and 1016 allow optical waveguides located in at least two different layers to be used in a multi-channel optical coupler, which, in turn, enables a compact multi-channel optical coupler.

Furthermore, the optical device shown in FIG. 10 includes a non-coupling waveguide crossing region 1026. In some implementations, the two waveguides (1003 and 1005 in this example) cross each other without having a parallel coupling region present at the crossing in the non-coupling waveguide crossing region 1026 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

5. Additional Description of Generalized Mach Zehnder Interferometers

In some embodiments, fast and low-loss optical switch networks can enable scalable quantum information processing using photonic qubits. For example, such networks can be employed within a linear-optical quantum computing (LOQC) system, since many such systems relies on non-deterministic processes of single-photon generation, entanglement generation and fusion measurements, and they also have important applications for quantum communications, such as enabling all-photonic quantum repeaters. However, the present disclosure is not limited to any particular use-case.

Advantageously, one or more embodiments disclosed herein provide for low loss, fast, and minimally-decohering photonic switch networks. Some embodiments provide for switch networks having a minimization of depth and count and are particularly suited for implementations that include active phase shifters, which are historically the largest contributors to the size and amount of noise in switch networks. Examples of switch networks will now be described. Such networks can be used, for instance, in any of the embodiments described above.

Components that can be used in photonic platforms include waveguides, directional couplers, passive and active (fast) phase shifters, crossings, single-photon detectors and heralded single-photon sources (HSPSs). S witch networks can be categorized according to their primary function as follows. N-to-1 (M) muxes (also referred to as N×1 muxes) map one (or multiple M) inputs to designated output ports. The inputs are commonly assumed to be probabilistic and of the same type, although more complicated assumptions apply in some problems. For example, a N-to-4 photon mux extracts groups of four photons from N HSPSs. Sometimes it is necessary to carefully distinguish the number of output (input) ports from the number of principal target outputs (inputs). Most commonly, the excess ports must be populated with the vacuum state, and the switch network is required to access specific distributions ("patterns") of the outputs (inputs) across the ports. We refer to switch networks as permutation networks when their primary purpose is to rearrange (subsets of) inputs, where the inputs should generally be regarded as inequivalent. Furthermore, switch networks are also classified on the basis of the photonic degree of freedom distinguishing their inputs. Schemes based on space and time are the most common, but the use of frequency, orbital angular momentum, and combinations of multiple degrees of freedom has also been proposed.

Figure 11A:
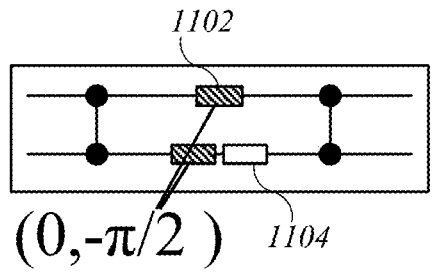
FIGS. 11A and 11B show building blocks of composite switch networks that can be used in some embodiments.
Figure 11B:
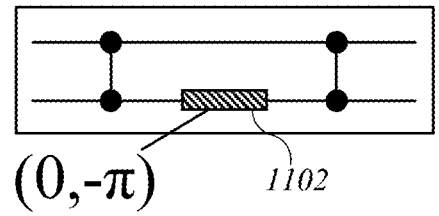

In some embodiments, Mach-Zehnder Interferometers (MZIs) may be used which are networks that implement identity or swap operations on two inputs. Two possible realizations of this type of circuit are shown in FIGS. 11A and 11B. FIGS. 11A and 11B show building blocks of composite switch networks. FIGS. 11A and 11B show 2-to-2 MZIs that implement identity or swap operations on the inputs. The circuits consist of two directional couplers with an active phase shifter (gray) on one or both arms between them. The push-pull configuration shown in FIG. 11A also has a fixed passive $-\pi/2$ phase shift (white) on one arm and selects between the two operations by setting the top or bottom active phase to $-\pi/2$. The configuration shown in FIG. 11B uses a 0 or $-\pi$ active phase to select the operation. Many switch network architectures are built by connecting multiple MZIs to form various topologies.

Figure 11C:
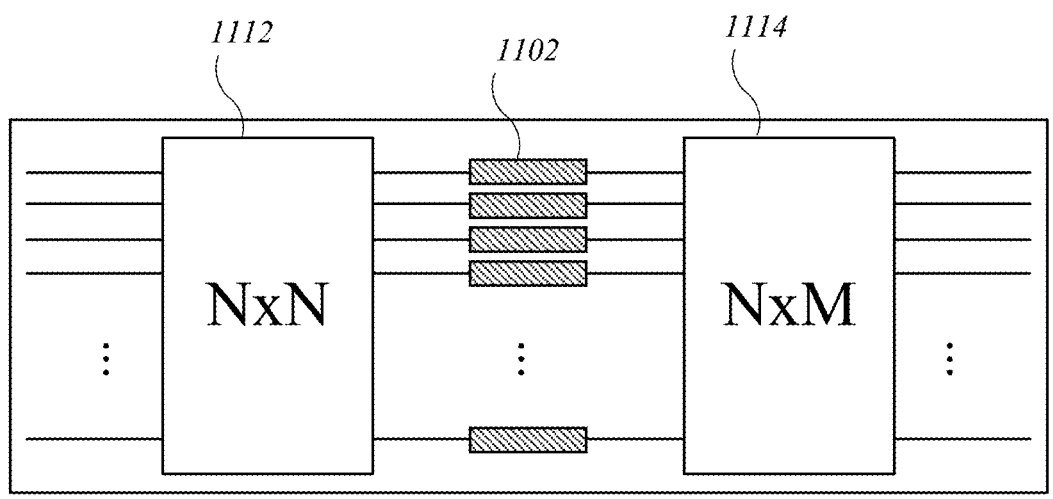
FIG. 11C shows a N-to-M GMZI that can be used in some embodiments.

The Generalized Mach-Zehnder Interferometer (GMZI) is an extension of an MZI with N>2 inputs and M≥1 outputs, shown in FIG. 11C. This configuration allows a set of permutations to be performed on the inputs, as discussed in further detail below, making this device a powerful block for the construction of composite N-to-1 and N-to-M switch networks. FIG. 11C shows a N-to-M GMZI made of two passive balanced splitter networks (white) and a layer of N active phase shifters (gray). Varying the settings of the active phases selects specific permutations of the N inputs and routes them to M>1 output ports.

There are a number of spatial mux schemes that select one of multiple inputs from distinct locations in space. For example, a N-to-1 GMZI can be used as a mux, since it allows routing of any input to a single output port. The advantages of this scheme are its low constant active phase shifter depth (1) and count (N). However, the total propagation distance and the number of waveguide crossings increase rapidly with N. This downside of the monolithic GMZI structure is obviated by constructing composite switch networks of 2-to-1 MZIs, at the cost of increasing the component depth and count. Two examples of N-to-1 schemes of this kind include the "log-tree" and "chain", both of which can be built with no crossings.

Figure 12A:
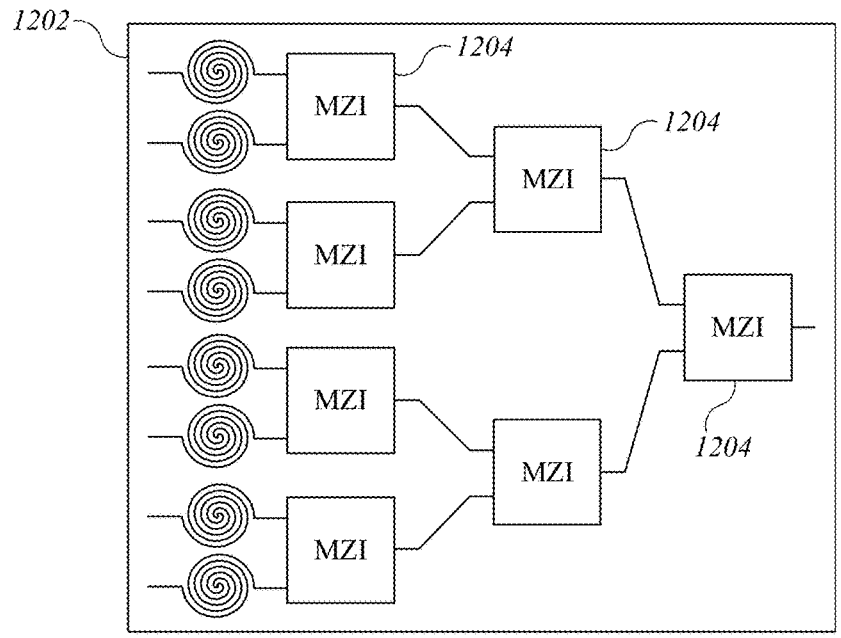
FIGS. 12A and 12B show spatial N-to-1 muxes, with inputs at N spatially-distinct locations (ports), that can be used in some embodiments.
Figure 12B:
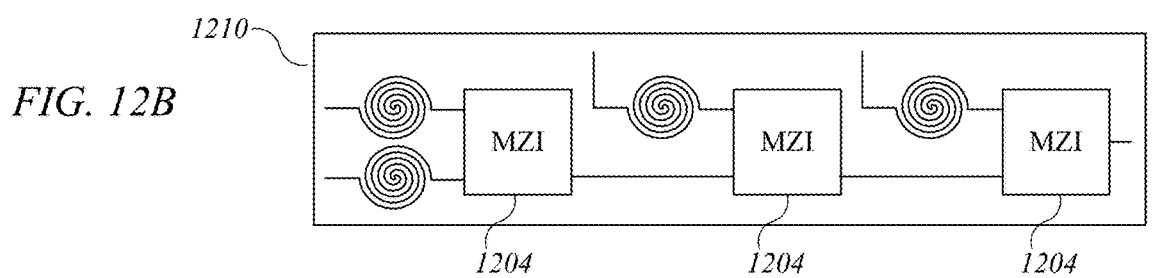

FIGS. 12A and 12B show spatial N-to-1 muxes, with inputs at N spatially-distinct locations (ports). FIG. 12A shows a log-tree mux (N=8 example). 2-to-1 MZIs form a tree structure with $2(2^{\lceil \log(N) \rceil}-1)$ active phase shifters arranged in $\lceil \log_2(N) \rceil$ layers. FIG. 12B shows a chain mux (N=4 example). (N−1) MZIs are connected through one output and input to form a line. The active phase shifter count is the same as for the log-tree, but the depth varies between 1 and (N−1).

In a "log-tree", the MZIs form a converging symmetric tree of degree 2, where the chosen input is routed from one of the leaves to the root, as shown in FIG. 12A. An asymmetric variant of this scheme, known as a "chain", includes MZIs cascaded to form a linear topology in which each block selects either the output of the previous block or the new input, as shown in FIG. 12B. The depth of the network traversed by the output depends on the chosen input, which can worsen the interference of resources from different chains, due to imbalanced losses and errors. The switching logic of this scheme presents an interesting advantage: while being very simple and entirely local to each individual MZI, it minimizes the amount of error on by selecting the input available closest to the output. Analysis of these three schemes in the context of single photon multiplexing shows that all three architectures require components with performance well beyond the state-of-the-art to achieve a multiplexing efficiency high enough for use in LOQC.

Figure 13A:
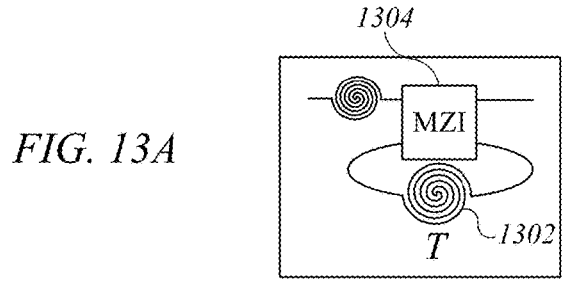
FIGS. 13A and 13B show N-to-1 temporal muxes, with inputs in N distinct time bins, that can be used in some embodiments.

In temporal multiplexing, resources can be input at the same spatial location but different times, and the aim is to produce an output in a specific time bin. This requires networks with fewer components, but the output time bins become longer. There are two main kinds of temporal schemes: designs with storage devices, such as cavities or fiber loops, and designs based on networks of delays The former simply consist of a storage device and a single 2×2 switch network used to choose whether to store or output each input, as shown in FIG. 13A. This can be thought of as the temporal version of a chain mux, and it presents the same advantage in terms of switching logic. The log-tree also has a temporal equivalent known as a "binary-division delay network". This scheme consists of a series of MZIs with delays of different lengths between them, as illustrated in FIG. 13B.

Figure 13B:
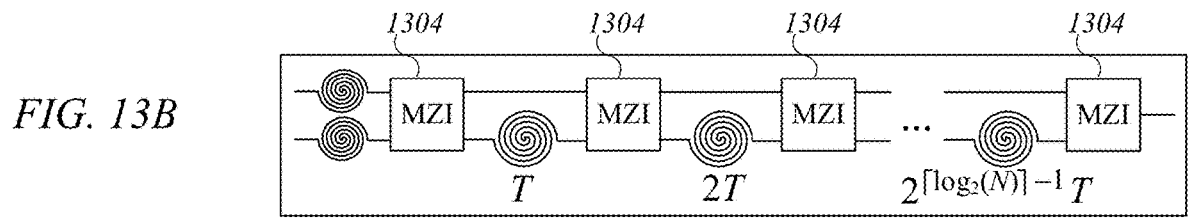

FIGS. 13A and 13B show N-to-1 temporal muxes, with inputs in N distinct time bins. FIG. 13A shows a storage loop scheme (time chain). A 2×2 MZI receives one resource per time bin T and routes it to a storage device (a delay line here) or discards it. After N time bins, the chosen input is output. The number of active phase shifters in the path of the chosen input varies between 1 and N. FIG. 13B shows a binary delay network (time log-tree). The scheme comprises a series of $\lceil \log_2(N) \rceil+1$ MZIs with delays of lengths $2^n T$ between them, where T is the duration of a time bin at the input and n=0, . . . $\lceil \log_2(N) \rceil-1$. The active phase shifter depth scales as with the number of input time bins as $\lceil \log_2(N) \rceil$.

The topologies described above can be generalized by replacing each MZI with a GMZI with n inputs, as shown in FIGS. 14A-14D. This introduces a trade-off between the active phase shifter depth and count, which decreases with n, and the number of waveguide crossings and propagation distance within each block, which increases with n. In addition, this modification turns temporal schemes into hybrid networks, where multiple spatially distinct resources are input in each time bin. The trade-offs introduced by the parameter n can be exploited to optimize the structure of these schemes for different regimes of physical error rates.

Figure 14C:
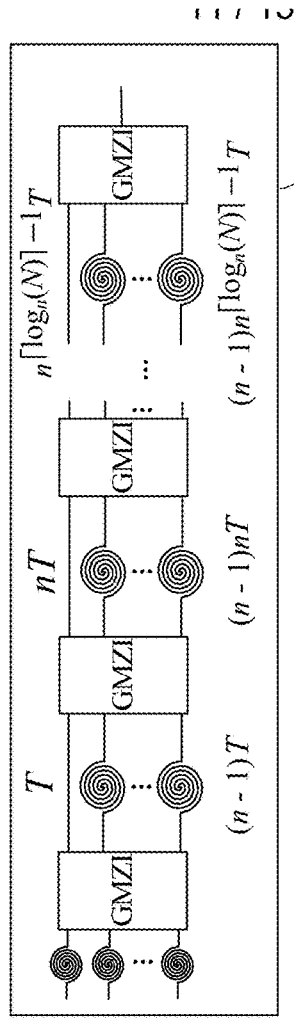
FIGS. 14A-14D show examples of generalized N-to-1 composite multiplexing networks that can be used in some embodiments.
Figure 14B:
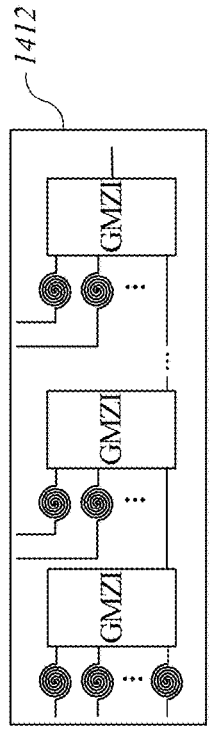
Figure 14D:
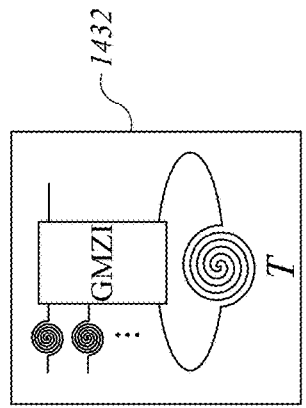
Figure 14A:
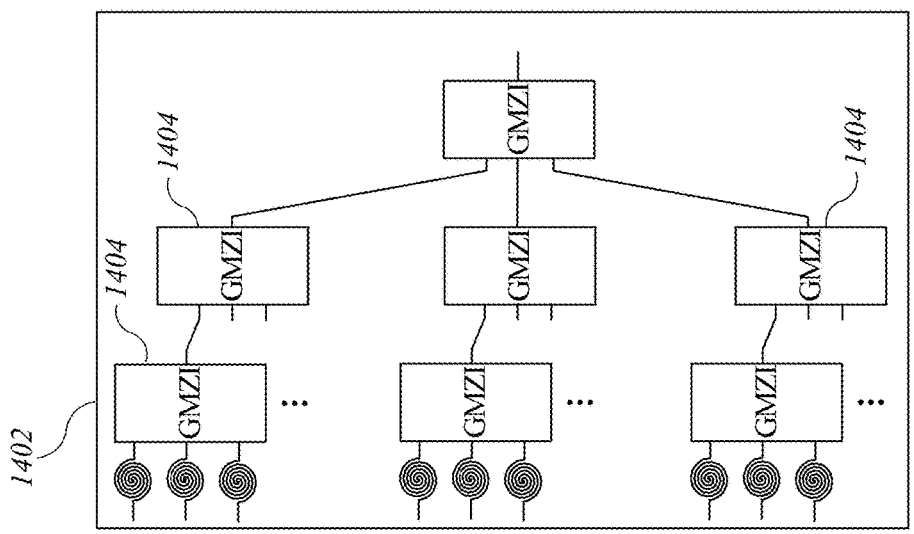

FIGS. 14A-14D show examples of generalized N-to-1 composite multiplexing networks, obtained by replacing the MZI sub-blocks with n×1 GMZIs. FIG. 14A shows a generalized spatial log-tree (n=3 example with some first layer GMZIs omitted for simplicity). The degree of the tree is n and its depth is $\lceil \log_n N \rceil$. FIG. 14B shows a generalized spatial chain. Each stage after the first takes n−1 new inputs, so that the depth of the network varies between 1 and $\lceil (N-1)/(n-1) \rceil$. FIG. 14C shows a generalized delay network (time log-tree). The GMZIs enclose $\lceil \log_n N \rceil$ layers of n−1 delays with lengths $n^i$, ... $(n-1)n^i$, where i=0, ..., $\lceil \log_n N \rceil - 1$ is the index of the layer of delays. The number of active phase shifters on a path across the scheme is $\lceil \log_n N \rceil + 1$. FIG. 14D shows a generalized storage loop scheme. n−1 inputs enter the GMZI in every time bin. After $\lceil N/(n-1) \rceil$ time bins, the GMZI outputs the chosen input.

In applications such as LOQC, which rely on the interference of multiplexed resources, multiplexing is used to produce synchronized outputs. The schemes described so far achieve this by having a single predetermined output spatio-temporal bin. However, when large output probabilities are needed this leads to a large of resources, which can be understood as follows. The number of available resources for a network of size N follows a binomial distribution with average value $\bar{N}=Np$, where p is the probability of an input being populated. The probability of a network successfully producing an output is then $p_{mux}=1-(1-p)^N$. For the typical situation with large N and small p values, the binomial distribution is well approximated by a Poissonian distribution, and so $p_{mux} \cong 1-e^{-Np}$. It follows that the average number of inputs scales as $Np=-\ln(1-p_{mux})$, and so the number of available resources that are not used grows rapidly as $p_{mux}$ approaches 1. An alternative approach that leads to major efficiency improvements is relative multiplexing. Rather than routing resources to single pre-allocated outputs, this technique uses spatial or temporal log-tree networks to synchronize selected inputs in variable space-time locations, chosen depending on the resources available at any particular instant.

N-to-M schemes in the literature are generally based on the spatial degree of freedom. The simplest of these is a GMZI with more than one output, which has the appealing feature of a single layer of N active phase shifters. However, it only gives access to N permutations, and therefore to limited combinations of inputs. Consequently, the N×M GMZI is more useful when used as a permutation network or as a building block for larger schemes. More flexible routing is achieved by using smaller networks to build composite topologies, known as "switch fabrics". However, the component depth and count and the size of the crossing networks of these schemes tend to be large, and these downsides trade against each other, making the networks impractical for use in the field of quantum applications.

Figure 15A:
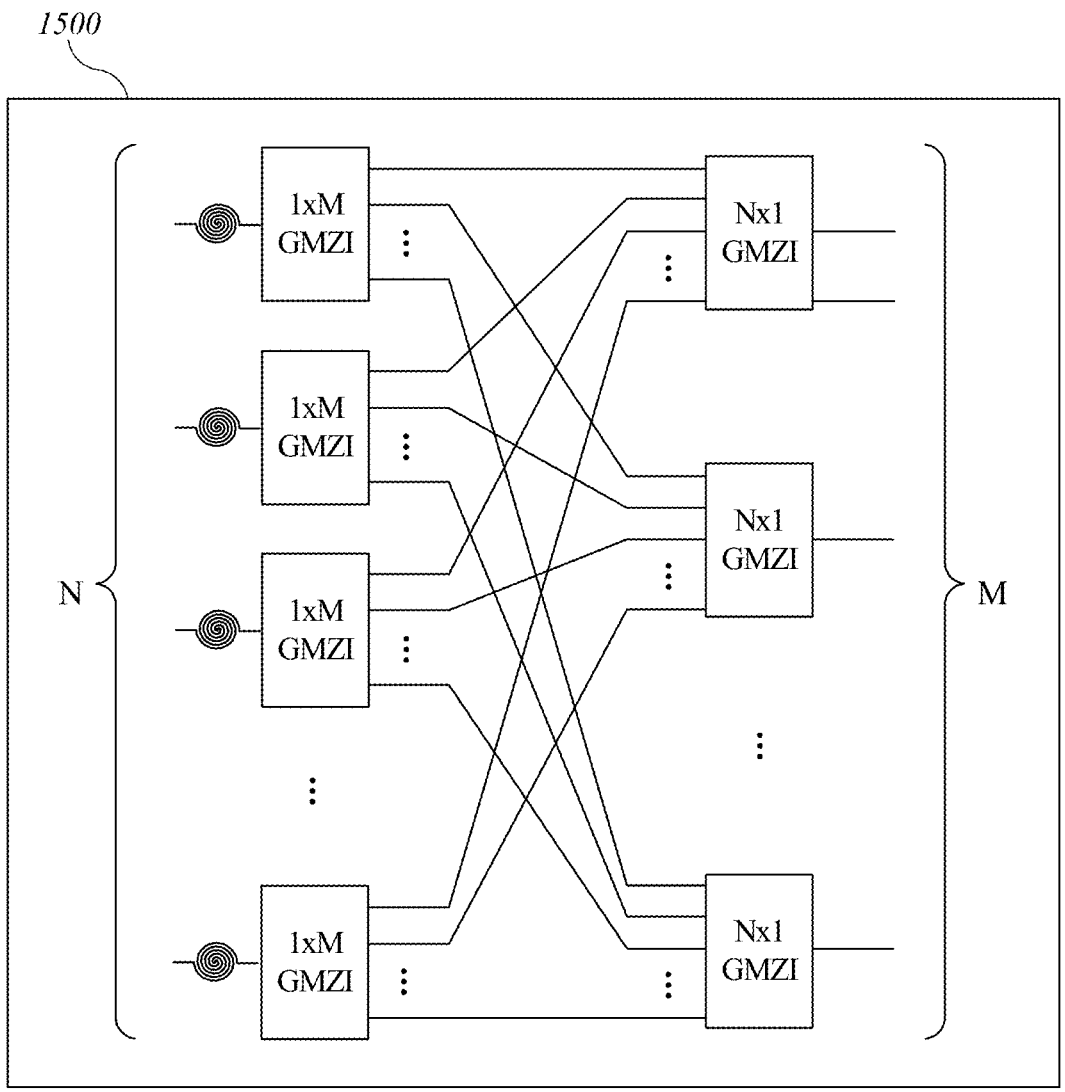
FIGS. 15A and 15B show examples of N-to-M switch networks that can be used in some embodiments.

As an example, Spanke's tree network, shown in FIG. 15A, allows arbitrary rerouting of the inputs with a constant active switch depth of 2, at the cost of a large number of active phase shifters and waveguide crossings. However, the number of active phase shifters and waveguide crossings scales as O(NM). On the other hand, the scheme shown in FIG. 15B avoids large crossing networks, but has an active phase shifter count O(NM) and depth that varies between 1 and M, resulting in variable error rates on the outputs.

Figure 15B:
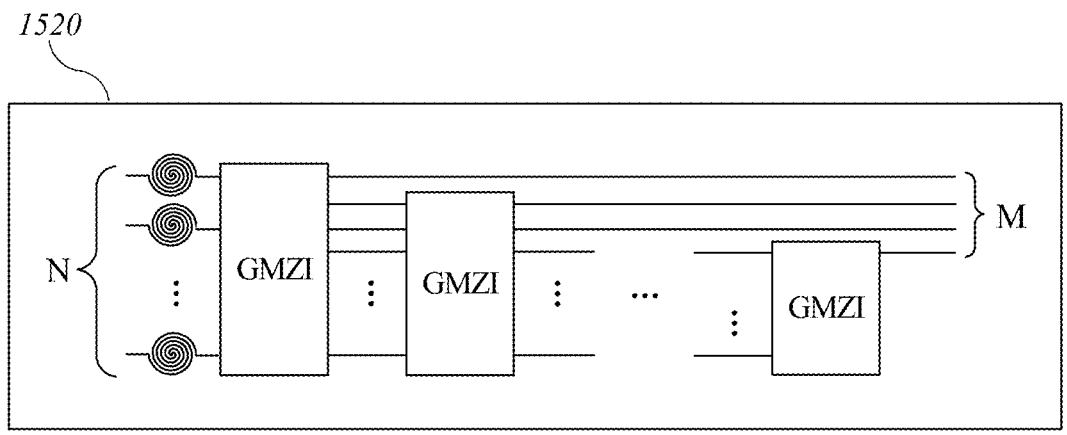

FIGS. 15A and 15B show examples of N-to-M switch networks. FIG. 15A shows a Spanke network. Two layers of interconnected GMZIs allow arbitrary routing of N inputs to M outputs. The fixed active phase shifter depth of 2 makes this scheme interesting, but the scaling of the number of active phase shifters and crossings scaling as (NM) poses challenges for large sizes. FIG. 15B shows a concatenated GMZI. This scheme consists of M concatenated GMZIs with progressively fewer outputs. No complex crossing networks are required between its building blocks, but the O(NM) active phase shifter count and variable depth up to M limit the maximum feasible network size.

For quantum applications, where low error rates are required, N-to-M muxes need to be simplified to reduce the number of active phase shifters, both in total and along the path to the output, as well as the complexity of the crossing networks. The routing algorithms associated with these networks also need to be simplified, to avoid the need for unfeasibly long delays for the inputs. The complexity of the logic is largely determined by its generality, so restricting the operation of the networks to specific tasks is helpful to reduce processing times. These provide guiding principles for the design of additional schemes.

A general switch network implements a set of unitary transfer matrices $U_k$, where each unitary routes light between a subset of input and output ports. If $U_k$ routes light from port t to port s, then its sth row and tth column must be zero apart from $|U_{s,t}|=1$, and similarly for other pairings of input and output ports. The aim of this section is to elucidate the sets of routing operations that are achievable using the simplest form of a many-mode switching network, which is to say one corresponding to transfer matrices $U_k = W D_k V^\dagger$, where the unitary matrices W, $V^\dagger$ describe passive interferometers, and the $D_k$ form a set of diagonal phase matrices. The phase matrices are implemented physically using a single layer of fast phase shifters acting on every mode, and for simplicity, we will write D in terms of a phase vector d, $D_{s,t}=d_s \delta_{s,t}$. The discussion below provides a comprehensive treatment of these switch networks and presents several new constructions.

An important class of switch networks is obtained by considering sets of permutation matrices $\{U_k = W D_k V^\dagger\}$. By adding the fixed passive network corresponding to e.g. $U_1^{-1}$ (so, the inverse of an arbitrary permutation from that set), we obtain a new set $\{U_k U_1^{-1}\}\{W D'_k W^\dagger\}$ of pairwise commuting permutation matrices. So it makes sense to restrict the discussion to the case where the $\{U_k\}$ are commuting. Switch networks of this type were introduced above as "Generalized Mach-Zehnder interferometers" (GMZIs). Here we need a more precise definition for GMZIs, and we will define them as switch networks having the following specific properties:

(i) $\{U_k = W D_k W^\dagger\}$ is a set of transfer matrices corresponding to commuting permutations of N modes. The entries of $D_k$ are given by roots of unity (up to an overall global phase factor $e^{i\Phi_k}$ which can be chosen at will).

(ii) The GMZI switch setting $D_k$ routes light from input port 1 to output port k.

From these properties it is straightforward to prove that the GMZI must have exactly N settings, and that for any choice of input and output port, there is exactly one setting which routes light between the ports.

From a mathematical standpoint, the set of operations implemented by a GMZI on N modes forms an abelian group of order N. This fact is very helpful here as it allows us to characterize the entire family of GMZIs defined by (i), (ii) using well-known results from group theory (namely the basis theorem for finite abelian groups). In particular, for any GMZI, $\{U_k\}$ must be isomorphic to a direct sum of cyclic groups, where the order of each of the cyclic groups is a power of a prime number.

To be more concrete, we define groups of commuting permutations $\mathcal{G}([n_1, n_2, \ldots, n_r])$ generated by matrices $C^{(n_1)} \otimes I^{(n_2)} \otimes I^{(n_3)} \ldots, I^{(n_1)} \otimes C^{(n_2)} \otimes I^{(n_3)} \ldots, I^{(n_1)} \otimes I^{(n_2)} \otimes C^{(n_3)} \ldots$, where $(C^{(n)})_{i,j} = \delta_{i,(j+1 \bmod n)}$ is a cyclic permutation matrix of size n, and $I^{(n_l)}$ is the $n_l \times n_l$ identity matrix, and $\otimes$ is the Kronecker product on matrices (The Kronecker product here acts at the level of linear-optical transfer matrices and should not be confused with tensor product operations on quantum state spaces), and the group operation is matrix multiplication. Then, any GMZI on N modes, satisfying properties (i), (ii) above, must implement a set of permutation operations which corresponds to one of the possibilities for $\mathcal{G}([n_1, n_2, \ldots, n_r])$ with $N=\Pi_{l=1}^{r} n_l$ (up to fixed mode permutations at the input and output).

The different types of GMZIs of fixed size can now be determined using the fact that $\mathcal{G}([n_1, n_2])$ and $\mathcal{G}([n_1 n_2])$ are isomorphic if and only if $n_1$ and $n_2$ are coprime. For example, for N=8, we can identify three fundamentally different types of GMZI.

(i) $\mathcal{G}([2,2,2])$, permutations are generated by Pauli matrices $X \otimes I^{(2)} \otimes I^{(2)}$, $I^{(2)} \otimes X \otimes I^{(2)}$, $I^{(2)} \otimes I^{(2)} \otimes X$.

(ii) $\{\mathcal{G}([4,2])\}$, permutations are generated by matrices $C^{(4)} \otimes I^{(2)}$ where $$C^{(4)} = \begin{pmatrix} & & & 1 \\ 1 & & & \\ & 1 & & \\ & & 1 & \end{pmatrix},$$

and $I^{(4)} \otimes X$.

(iii) $\mathcal{G}([8])$, permutations are generated by matrix $$C^{(8)} = \begin{pmatrix} & & & & & & & 1 \\ 1 & & & & & & & \\ & 1 & & & & & & \\ & & 1 & & & & & \\ & & & 1 & & & & \\ & & & & 1 & & & \\ & & & & & 1 & & \\ & & & & & & 1 & \end{pmatrix}.$$

We refer to GMZIs implementing $\mathcal{G}([2, 2, \ldots, 2])$, i.e. permutations of the form of swaps on subsets of modes, as "Hadamard-type" GMZIs due the type of passive interferometer which is used (explained below). Similarly, we refer to GMZIs implementing $\mathcal{G}([N])$ as "discrete-Fourier-transform (DFT)-type".

The discussion above characterizes the routing power of linear-optical circuits using one-layer of fast phase shifters in the switch network. In particular, a GMZI on N modes is limited to N routing operations, which is obviously small compared to the N! possible mode rearrangement operations. However, the possibility of implementing different sets of permutation operations is exploited by some of designs for spatial and temporal muxes which are discussed herein. Strictly speaking the limitation to N operations originates in property (ii) above—i.e. the ability to route light from any input port to any output port. More general constructions using a single stage of active phase shifts can be trivially obtained by acting with separate GMZIs on subsets of modes. The resulting transfer matrices are given by the direct sum of the individual GMZIs' transfer matrices. For example, using three MZIs in parallel results in a switch network on 6 modes, allowing 8 different settings. Such a construction can implement abelian groups of permutations of maximum order, which are given in J. M. Burns and B. Goldsmith, Bull. London Math. Soc. 21, 70 (1989), with the number of operations scaling to good approximation as $\sim 3^{N/3}$.

We now turn to linear-optical circuits that can implement the GMZIs defined above. In particular, a circuit that can implement the routing operations $\mathcal{G}([n_1, n_2, \ldots, n_r])$ on $N=\Pi_{l=1}^{r} n_l$ modes must enact transfer matrices of the form, $$P_k = (C^{(n_1)})^{k_1} \otimes (C^{(n_2)})^{k_2} \otimes \ldots \otimes (C^{(n_r)})^{k_r},$$

with settings vector k where $0 \leq k_l < n_l$ with $l=1, \ldots, r$. This can be achieved using a circuit with transfer matrices $W D_k W^\dagger$ as follows:

$$W = W^{(n_1)} \otimes W^{(n_2)} \otimes \ldots \otimes W^{(n_r)}$$

$$\text{with } (W^{(n_l)})_{s,t} = \frac{e^{i 2\pi s t / n_l}}{\sqrt{n_l}},$$

where the $W^{(n_l)}$ are DFT matrices; the $k^{th}$ setting of the fast phase shifters is given by $$D_k = D_{k_1}^{(n_1)} \otimes D_{k_2}^{(n_2)} \otimes \ldots \otimes D_{k_r}^{(n_r)},$$

with $(d_k^{(n)})_s = e^{-i 2\pi k s / n}$ for $D_k^{(n)}$.

One route to constructing practical interferometers for W and $W^\dagger$ is to reduce them to networks of beam-splitter and phase-shifter components using generic unitary decompositions from M. Reck et al., Phys. Ref Lett. 73, 58 (1994), or W. R. Clements et al., Optica 3, 1460 (2016). These decompositions have optical depth (number of optical elements encountered on the longest path through the interferometer) scaling as 2N −3 and N respectively. This means that the transmittance along the longest path will scale with an exponent which is proportional to the size parameter N—which presents a severe experimental limitation for scaling to large GMZI sizes.

Figure 17A:
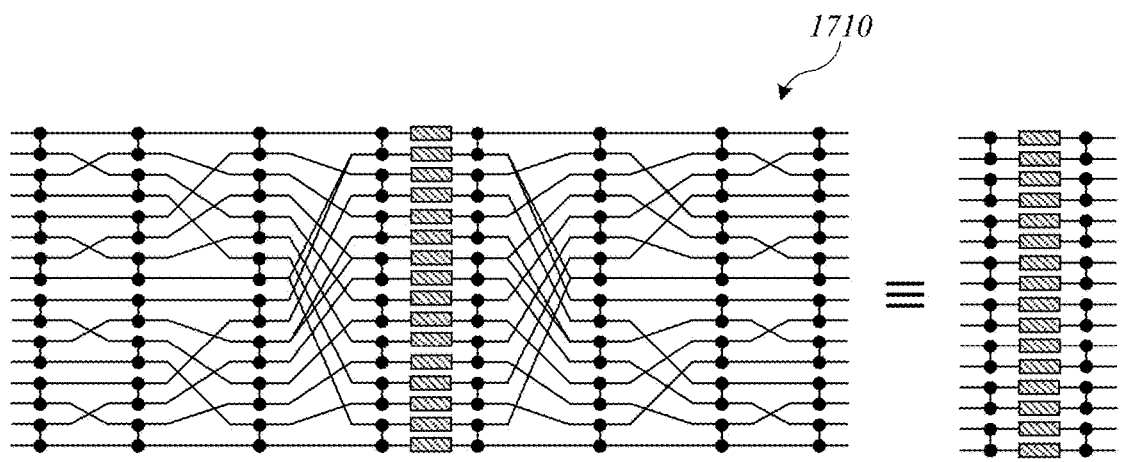
FIGS. 17A and 17B show Hadamard-type GMZI constructions that can be used in some embodiments.

GMZI networks—having a lot of special structure—allow for specific decompositions of the type given by equation 1600 shown in FIG. 16, where the matrices S.,. correspond to crossing networks which reorder modes within the interferometer. Since the subexpressions of the form $I^{(N/n_l)} \otimes V^{(n_l)}$ correspond to repeated blocks of modes interfering according to unitary $V^{(n_l)}$, the equation for Win FIG. 16 can be seen to describe stages of local interference separated by crossing networks. Note also that since the bracketed expressions in the decomposition commute there is some freedom in the configuration of the crossing networks, and some of them can be treated as relabelings of modes rather than physical circuit elements. FIG. 17A illustrates the construction of a Hadamard-type GMZI using the decomposition, as well as simplification which is possible when the GMZI is used as a N-to-1 mux.

Figure 17B:
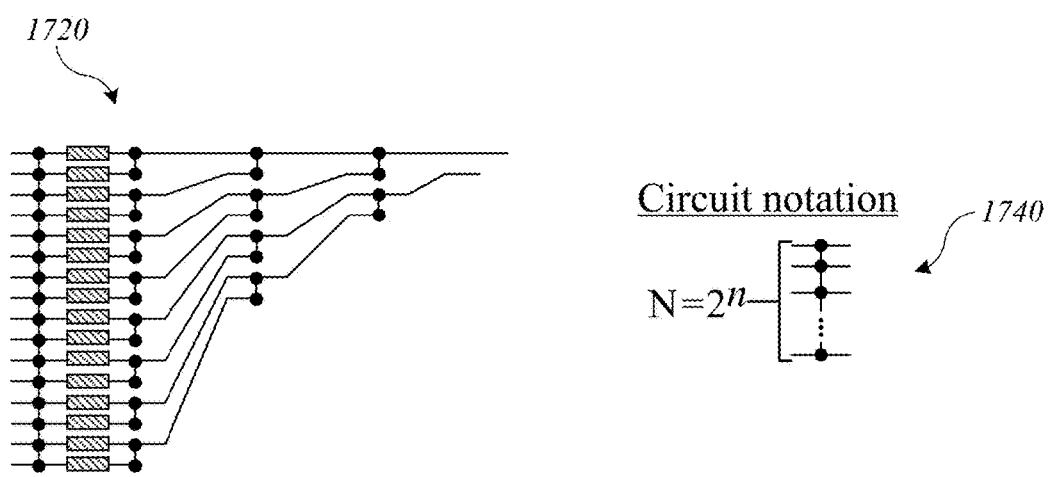

FIGS. 17A and 17B show Hadamard-type GMZI constructions: (i) in FIG. 17A, illustration of a linear-optical circuit for a GMZI on N=16 modes, for which the fast phase shifters are set to configurations of 0 and π to select one of 16 operations from $\mathcal{G}([2,2,2,2])$; (ii) in FIG. 17B, possible simplification of the circuit when only one output port is required—as is the case when the GMZI is used as a N-to-1 mux. The passive interferometers are constructed following the decomposition of W with stages of interference using 50:50 beam-splitters or directional couplers on pairs of adjacent modes, separated by crossings networks. Note that the phases in the physical interferometer generally differ from the constructions given in the main text, and this implies minor modifications for the transfer matrices and phase-shifter settings.

For more general GMZI types, we note that the unitary matrices $V^{(n_l)}$ can be decomposed into elementary beamsplitter and phase-shifter operations using the generic decomposition methods mentioned above. Alternatively, since the $V^{(n_i)}$ are assumed to be discrete Fourier transforms, they can be recursively decomposed into smaller discrete Fourier transforms acting on sets of local modes $I^{n_i/(n'_i)} \otimes V^{(n'_i)}$, $I^{n_i/(n''_i)} \otimes V^{(n''_i)}$ (for any sizes satisfying $n_i = n'_i \times n''_i$) together with crossings networks and additional phase shifts.

One more subtle feature of the GMZI constructions that was remarked on above is that the matrices $D_k$ for the GMZIs are determined up to a setting-dependent global phase factor $e^{i\phi_k}$. In principle these global phases can be freely set over a range $[0, 2\pi)$ (provided the active phase shifters themselves are configured with sufficient phase range). For an application such as single-photon multiplexing, the global phase factors have no role in the operation of the switch network. However, they can be useful if the switch network is applied to only some part of the input states (e.g. single rails from dual-rail qubits) or if it is incorporated in larger interferometers. In these cases, additional functionality can be absorbed into the operation of the switch network without adding extra layers of switching.

This idea is very useful for LOQC, where it is often desirable to multiplex some circuit which generates entangled states, whilst also applying internal adaptive corrections to its output. An example of this occurs when multiplexing Bell states from a standard BSG circuit. This circuit produces a Bell state across four modes with probability 3/16, but the Bell states do not conform to dual-rail qubit encoding (i.e. with qubits allocated to fixed pairs of modes) in a third of cases. Although this problem can be addressed using an additional MZI at the mux output to perform an optional mode-swap operation, a more elegant solution is presented in FIGS. 18A and 18B.

Figure 18A:
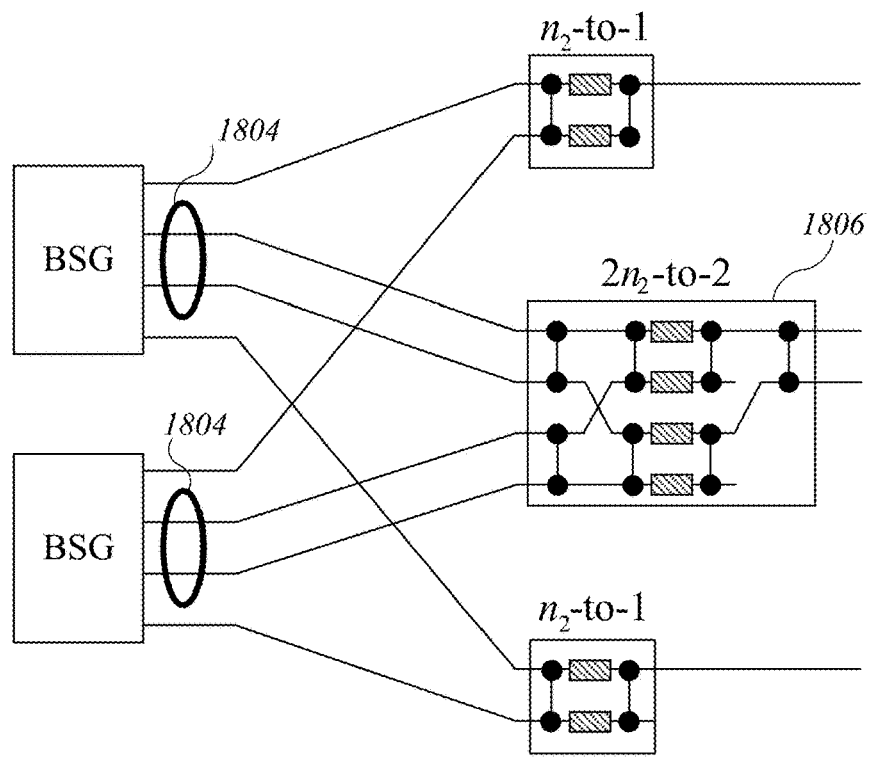
FIGS. 18A and 18B show examples of larger GMZI that can be used in some embodiments.
Figure 18B:
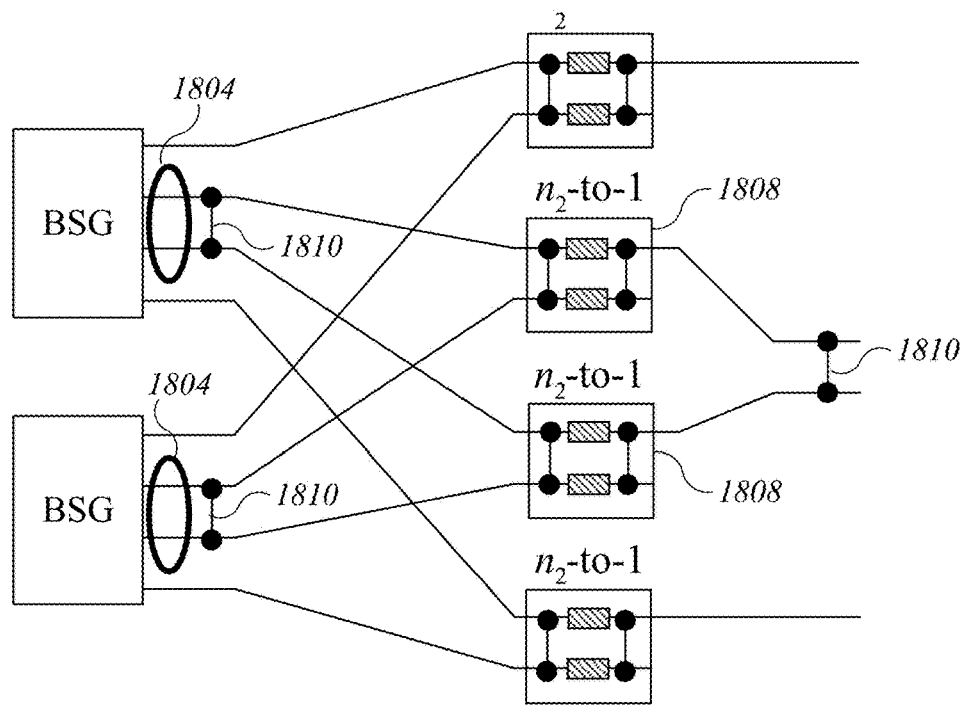

FIGS. 18A and 18B show examples of larger GMZI to implement adaptive swaps of rails while multiplexing Bell states generated with $n_2$ standard BSGs. FIG. 18A shows sending the two rails that might need to be swapped (circled in red) through a single GMZI of size $N = n_1 n_2$ ($n_1 = n_2 = 2$ in this diagram) allows multiplexing and permutation operations to be combined while avoiding the need for an additional switching stage. FIG. 18B shows that the modular structure of the GMZI can be exploited to apply portions of the circuit at different locations and to optimize the physical implementation. In this example, the network which incorporates the swap operation can be decomposed into two 2-to-1 GMZIs with extra directional couplers applied at the output of the BSGs and between the two output rails.

In this approach, a mux on $n_2$ copies of the BSG implements multiplexing and swap operations, using a size $N = n_1 n_2$ GMZI on $n_1 = 2$ inner rails from each BSG, and regular $n_2$-to-1 multiplexing for the outer rails. The ability to permute the rails increases the success probability for generating a dual-rail encoded Bell state from 1/8 to 3/16, and thereby decreases the amount of multiplexing needed to reach any particular target output probability by a factor of ~1.55.

More generally, the transfer matrices associated with a GMZI that implements the routing operations $\mathcal{G}([n_1, n_2])$ are $$P_{(k_1, k_2)} = (C^{(n_1)})^{k_1} \otimes (C^{(n_2)})^{k_2}$$
$$= (C^{(n_1)} \otimes I^{(n_2)})^{k_1} (I^{(n_1)} \otimes C^{(n_2)})^{k_2}.$$

This can be interpreted as $n_1$ separate copies of $n_2$-to-1 GMZIs (second term) with an additional set of permutations of the $n_1$ outputs also available (first term). So, permutations of $n_1$ rails can be implemented while multiplexing each one $n_2$ times by sending all $N = n_1 n_2$ inputs through a single larger GMZI rather than smaller separate ones. The key advantage of this method is that the depth and total number of active phase shifters do not change (1 and N respectively).

Using a larger GMZI comes at the cost of increasing the optical depth of the circuit, particularly in terms of waveguide crossings. As seen from the expression of W above, the passive interferometers in a GMZI can be decomposed into smaller networks connected by layers of crossings. This modular structure can be exploited to distribute parts of the circuit across different locations and avoid large on-chip crossing networks. In the BSG example, the implementation shown in FIG. 18B highlights how the first layer of crossings can be realized in a different way, e.g. using long distance phase-stable optical routing, to mitigate the impact of the largest crossing network in the interferometer.

The discussion so far presented a large family of GMZIs and explained their key properties, taking an approach focused on achievable sets of permutations which is different to earlier works. As well as N-to-1 muxing (potentially with extra functionality as explained above, these GMZIs have assorted applications as building blocks for spatial and temporal muxes. Alternative constructions of GMZIs are also possible, and it is valuable to explore them with a view to minimizing practical requirements on fast phase shifters. However, it is not feasible to exhaust all possible GMZI designs, as some properties for Hadamard matrices are not known. Instead we will highlight some specific new constructions with useful properties.

One observation is that phase swing requirements (where the swing is defined per phase shifter as the difference between the maximum and minimum phase shifts across all GMZI settings) can sometimes be reduced by introducing fixed phase-shift offsets. For some of the constructions above, the phase shifter settings correspond to complete sets of roots of unity, and the phase swing is $\pi$ for Hadamard interferometers and $>\pi$ for the other GMZI types. Table 1 shows examples of reduced swing for GMZI sizes $N = 2, 3, 4$ including examples of GMZIs with reduced phase swing using fixed phase-shift offsets. It is assumed that all the fast phase shifter components are identical and access the same range of phase shifts (which is minimized). Note that the use of offsets necessitates modification of the GMZI transfer matrices by additional phase factors—corresponding to setting-dependent "global" phases at the output.

TABLE 1

| GMZI type | Phase offsets | Comment |
|---|---|---|
| Hadamard N = 2 | $(-3\pi/2, 0)$ | Swing reduced from $\pi$ to $\pi/2$, coinciding with MZI variant in FIG. 11A. |
| DFT N = 3 | $(-4\pi/3, 0, 0)$ | Swing reduced from $4\pi/3$ to $2\pi/3$. |
| Hadamard N = 4 | $(-\pi, 0, 0, 0)$ | Swing unchanged at $\pi$, but for each setting only one phase shifter is set to $\pi$ and the others to 0. |

To find some more subtle constructions, we can consider general constraints on GMZIs implementing transfer matrices $U_k = W D_k V^\dagger$ on N modes, which are required to act minimally as N-to-1 muxes. It is straightforward to prove a lemma stating that (a), V in this case must be proportional to a complex Hadamard matrix (i.e. V must satisfy $|V_{s,t}|=1/\sqrt{N}$ as well as being unitary), and (b) the phase vectors $d_k$ must be orthogonal. A simple consequence of this result is that it is never possible to construct any GMZI for which the phase-shifter swing is less than $\pi/2$ (since it is never possible to achieve 0 for the real part of $\langle d_k, d_{k'}\rangle$). Similarly, when the phase-shifter values are restricted to $\{0, \pi/2\}$ it is not possible to find more than 2 orthogonal vectors $d_k$ for any even value of N (and never more than 1 for odd values of N), which is to say that it is not possible to do better than a 2-to-1 mux.

As another application of this lemma, one can look for sets of orthonormal phase vectors $\{d_k\}$ and construct a GMZI which uses these as phase settings for a N-to-1 mux, by choosing V to have row vectors $v_k=d_k$, and any unitary W with first row vector $w_1=(1, 1, \ldots, 1)/\sqrt{N}$. An interesting and non-trivial example of such a set of phase vectors is given in Table 2. More specifically the able below shows examples of six orthogonal phase vectors with a subset $d_1, \ldots, d_4$ having a reduced phase swing of $2\pi/3$ (compared to $4\pi/3$ for the entire set). A N=6 GMZI constructed using these settings can implement a 4-to-1 mux which has phase swing of only $2\pi/3$ (by restricting to the first four phase-shifter settings). Furthermore, it is easily seen that this example is not related to the constructions above since the only possibility would be the GMZI implementing $\mathcal{G}([6])\cong\mathcal{G}([3,2])$, for which individual phase settings range on six values (compared to three in Table 2).

TABLE 2

Settings for a N = 6 GMZI acting as a 6-to-1 mux $d_1 = (1, 1, 1, e^{-2i\pi/3}, e^{-2i\pi/3}, e^{-2i\pi/3})/\sqrt{6}$
$d_2 = (1, e^{-2i\pi/3}, e^{-2i\pi/3}, 1, e^{-2i\pi/3}, 1)/\sqrt{6}$
$d_3 = (e^{-2i\pi/3}, 1, e^{-2i\pi/3}, e^{-2i\pi/3}, 1, 1)/\sqrt{6}$
$d_4 = (e^{-2i\pi/3}, e^{-2i\pi/3}, 1, 1, 1, e^{-2i\pi/3})/\sqrt{6}$
$d_5 = (1, e^{-2i\pi/3}, e^{-4i\pi/3}, e^{-2i\pi/3}, 1, e^{-4i\pi/3})/\sqrt{6}$
$d_6 = (e^{-2i\pi/3}, 1, e^{-4i\pi/3}, 1, e^{-2i\pi/3}, e^{-4i\pi/3})/\sqrt{6}$ Finally, we turn to a new way of using GMZIs when phase settings are modified from those connecting single input and output ports. Taking Hadamard-type GMZIs with transfer matrices $U_k=WD_kW^\dagger$ on N modes, consider first when the phase vector $d_{k'}$ for $D_{k'}$ is modified so that $-\pi$ phases are set to a (common) value $-\phi$, while the 0 phases are unchanged. In this case $U_{k'}$ is modified to $$\tilde{U}_{k'}(\phi) = e^{-i\phi/2}\left[\cos\left(\frac{\phi}{2}\right)I^{(N)} + i\sin\left(\frac{\phi}{2}\right)U_{k'}\right].$$

This unitary maps a single photon incident at one input port to a superposition across the mode at the input and the output under the permutation $U_k$, with weighting controlled by the value of $\phi$. Further modification of the phase settings can achieve mappings from one input to arbitrary pairs of output ports suppose it is desired to map from input port $p_1$ to output ports $q_1$ and $q_2$, then this can be implemented by finding the (unique) settings $k_1$, $k_2$ with $U=WD_{k_{1(2)}}W^\dagger:p_1\mapsto q_{1(2)}$, and choosing phase vector $$\tilde{d} = e^{-i\phi/2}\left[\cos\left(\frac{\phi}{2}\right)d_k + i\sin\left(\frac{\phi}{2}\right)d_{k'}\right].$$

The transfer matrix for the GMZI is then $$\tilde{U}(\phi) = e^{-i\phi/2}\left[\cos\left(\frac{\phi}{2}\right)U_k + i\sin\left(\frac{\phi}{2}\right)U_{k'}\right],$$

where the individual phase settings are taken from the set $\{0, -\phi, -\pi, -\pi-\phi\}$. Note that a second input port $P_2$ is also mapped to the pair $q_1$ and $q_2$, where $U_kU_{k'}: p_1\mapsto p_2$. We call a GMZI used according to the equation above for $\tilde{U}(\phi)$ a switchable pairwise coupler and it can be useful in spatial and temporal muxes (with the proviso that paired ports receive the vacuum state to avoid contamination of the intended input).

6. Additional Embodiments

While the invention has been described with reference to specific embodiments, those skilled in the art will appreciate that variations and modifications are possible. For instance, the examples described above refer to Hadamard-type GMZIs. Hadamard-type GMZIs are well suited to counter-propagating implementations because the propagation of the light for propagation and counter-propagation directions is described by transfer matrices which are related by matrix transposition. Hadamard-type GMZIs generate permutations that correspond to symmetric matrices. Thus, Hadamard-type GMZIs can easily implement identical optical transformations in both directions, making them advantageous for counterpropagating GMZIs. However, counterpropagating GMZI configurations can also be implemented using other types of GMZIs.

Operation of a GMZI can be independent of the upstream source or downstream destination of the photons. As used herein, a "photon source" can include any optical circuits or devices, in any combination, capable of outputting a photon on an optical waveguide that can be coupled to an input port of a GMZI. Similarly, operation of a GMZI is independent of any downstream use of the output photons. As used herein, "a photon receiver" can include a waveguide or any optical circuits or devices, in any combination, into which photons can be input.

Further, embodiments described above include references to specific materials and structures (e.g., optical fibers), but other materials and structures capable of producing, propagating, and operating on photons can be substituted.

Classical control logic and/or classical decision logic circuits can be implemented on-chip with the waveguides, beam splitters, detectors and/or and other photonic circuit components or off-chip as desired. Any of the classical logic circuits described herein can be implemented using a microprocessor, microcontroller, field programmable gate array (FPGA), application-specific integrated circuit (ASIC) or any other digital logic circuitry. In some embodiments, some or all of the classical logic circuits can be implemented in a classical computer system.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added. The terms "upstream" and "downstream" are used herein in reference to the direction of photon propagation along an optical path such as an optical fiber or other waveguide and are not intended to imply any particular physical arrangement of waveguides.

A recitation of "a", "an" or "the" is intended to mean "one or more" unless specifically indicated to the contrary. Reference to "one" of a particular component, feature, or other element is not intended to preclude additional co-existing instances of that component, feature, or other element, unless specifically indicated to the contrary. The use of "or" is intended to mean an "inclusive or," and not an "exclusive or" unless specifically indicated to the contrary.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. A circuit comprising:
    a plurality of input ports to receive photons, the plurality of input ports including a first set of input ports and a second set of input ports;
    a plurality of output ports to output photons, the plurality of output ports including a first set of output ports and a second set of output ports; and
    a plurality of optical components including a plurality of active phase shifters, the plurality of optical components interconnected to form a generalized Mach Zehnder interferometer (GMZI) configured to selectably establish a first optical path between one of the input ports of the first set of input ports and one of the output ports of the first set of output ports and a second optical path between one of the input ports of the second set of input ports and one of the output ports of the second set of output ports,
    wherein the first optical path and the second optical path include an overlapping portion that includes at least one of the active phase shifters and wherein a propagation direction through the overlapping portion along the first optical path is counter to a propagation direction through the overlapping portion along the second optical path.

2. The circuit of claim 1 wherein the input ports are coupled to a photon source that provides photons concurrently to one or more input ports of the first set of input ports and to one or more input ports of the second set of input ports.

3. The circuit of claim 1 wherein the first set of output ports includes exactly one output port and the second set of output ports includes exactly one output port.

4. The circuit of claim 1 wherein each of the first set of input ports and each of the second set of output ports includes a number (N) of input ports that is at least equal to 2 and each of the first set of output ports and the second set of output ports includes a number of output ports equal to the number N.

5. The circuit of claim 1 wherein the GMZI is a Hadamard-type GMZI.

6. The circuit of claim 1 wherein the input ports in the first set of input ports have a one-to-one correspondence with the input ports in the second set of input ports and the output ports in the first set of output ports have a one-to-one correspondence with the output ports in the second set of output ports.

7. The circuit of claim 6 wherein the GMZI is a Hadamard-type GMZI and the one-to-one correspondence is determined based on a configuration of the active phase shifters associated with an identity transform.

8. The circuit of claim 6 wherein:
    the plurality of input ports are configured to receive a plurality of qubits in a dual-rail encoding having a first waveguide that maps to a first logical state of the qubit and a second waveguide that maps to a second logical state of the qubit;
    the first waveguide for each qubit is coupled to a respective one of the input ports in the first set of input ports; and
    the second waveguide for each qubit is coupled to the corresponding one of the input ports in the second set of input ports.

9. The circuit of claim 8 wherein each of the first set of input ports and each of the second set of output ports includes at least two input ports and each of the first set of output ports and the second set of output ports includes exactly one output port.

10. The circuit of claim 9 wherein the circuit further comprises:
    control logic coupled to the GMZI and configured to select one of the qubits received at the input ports to propagate to the output ports.

11. The circuit of claim 8 wherein each of the first set of input ports and each of the second set of output ports includes a number (N) of input ports that is at least equal to 2 and each of the first set of output ports and the second set of output ports includes a number of output ports equal to the number N.

* * * * *